(12) United States Patent
Liu et al.

(10) Patent No.: US 11,340,074 B2
(45) Date of Patent: May 24, 2022

(54) POSITIONING METHOD, POSITIONING APPARATUS, AND COMPUTER-PROGRAM PRODUCT

(71) Applicant: BOE Technology Group Co., Ltd., Beijing (CN)

(72) Inventors: Cheng Liu, Beijing (CN); Changlin Leng, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 601 days.

(21) Appl. No.: 16/333,179

(22) PCT Filed: Sep. 25, 2018

(86) PCT No.: PCT/CN2018/107268
§ 371 (c)(1),
(2) Date: Mar. 13, 2019

(87) PCT Pub. No.: WO2019/174213
PCT Pub. Date: Sep. 19, 2019

(65) Prior Publication Data
US 2021/0364296 A1 Nov. 25, 2021

(30) Foreign Application Priority Data
Mar. 14, 2018 (CN) .......................... 201810209350.7

(51) Int. Cl.
*G01C 21/16* (2006.01)
*G01C 21/20* (2006.01)

(52) U.S. Cl.
CPC ....... *G01C 21/1656* (2020.08); *G01C 21/206* (2013.01)

(58) Field of Classification Search
CPC .................. G01C 21/1656; G01C 21/206
See application file for complete search history.

(56) References Cited

U.S. PATENT DOCUMENTS 6,018,697 A   1/2000  Morimoto et al.
9,736,910 B2* 8/2017  Chen ..................... G01B 7/14
                      (Continued)

FOREIGN PATENT DOCUMENTS

CN    102104732 A    6/2011
CN    104048661 A    9/2014
                      (Continued)

OTHER PUBLICATIONS

International Search Report & Written Opinion dated Jan. 9, 2019, regarding PCT/CN2018/107268.
(Continued)

*Primary Examiner* — Hunter B Lonsberry
*Assistant Examiner* — Paysun Wu
(74) *Attorney, Agent, or Firm* — Intellectual Valley Law, P.C.

(57) ABSTRACT

A positioning method includes determining a positioning coordinate $(x_{101}, y_{101}, z_{101})$ of a positioning device in a scene coordinate system o-xyz based on one or a combination of (1) an estimated coordinate $(x_1, y_1, z_1)$ of the positioning device in the scene coordinate system o-xyz; and (2) positions of image objects of one or more reference illumination sources of a plurality of illumination sources in a scene image, fixed coordinate positions $(x_0, y_0, z_0)$ of the one or more reference illumination sources of the plurality of illumination sources in the scene coordinate system o-xyz, and an included angle α between an x-axis of the scene coordinate system o-xyz and an x'-axis of a positioning device coordinate system o'-x'y'z'.

20 Claims, 6 Drawing Sheets

(56) References Cited

U.S. PATENT DOCUMENTS

| | | |
|---|---|---|
| 2011/0149016 A1 | 6/2011 | Kimura |
| 2013/0026224 A1 | 1/2013 | Ganick et al. |
| 2016/0139234 A1 | 5/2016 | Ganick et al. |
| 2017/0178360 A1 | 6/2017 | Baggen et al. |
| 2017/0244935 A1* | 8/2017 | Shishalov ............ G06K 9/6202 |
| 2018/0180744 A1* | 6/2018 | Lu ........................... G01S 19/48 |

FOREIGN PATENT DOCUMENTS

| | | |
|---|---|---|
| CN | 105674986 A | 6/2016 |
| CN | 106092090 A | 11/2016 |
| CN | 106338712 A | 1/2017 |
| CN | 106767775 A | 5/2017 |
| CN | 106840140 A | 6/2017 |
| CN | 107219517 A | 9/2017 |
| CN | 107238831 A | 10/2017 |
| CN | 107421540 A | 12/2017 |
| WO | 2008009966 A2 | 1/2008 |
| WO | 2017125338 A1 | 7/2017 |

OTHER PUBLICATIONS

Indoor Positioning Technology Last Meter-Is this Opportunity Belongs to Optical Communication?, Netease Technology, Apr. 9, 2015, http://tech.163.com/15/0409/10/AMOKI4EQ00094P0U.html, English Translation Attached.

Application Prospect of Visible Light Communication Indoor Positioning Technology, Bin Zhao, 2017 Suzhou International Indoor Wireless Real-time Positioning Technology and Application Summit, Suzhou, China, http://news.rfidworld.com.cn/2017_04/f317fcd962e899ec.html, English Translation Attached.

Extended European Search Report in the European Patent Application No. 18855111.3, dated Nov. 16, 2021.

* cited by examiner

POSITIONING METHOD, POSITIONING APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/107268, filed Sep. 25, 2018, which claims priority to Chinese Patent Application No. 201810209350.7, filed Mar. 14, 2018, the contents of which are incorporated by reference in the entirety.

TECHNICAL FIELD

The present invention relates to display technology, more particularly, to a positioning method, a positioning apparatus, and a computer-program product.

BACKGROUND

In modern society, people spend more and more time staying indoors. The lifestyle change demands significantly better indoor positioning and navigation techniques. The technology of the indoor positioning and navigation can be used in various situations, such as downhole positioning, navigation in a nuclear power plant, navigation in a shopping mall, medical rescue, targeted infomercial applications, underground parking lot navigation, airport navigation, voice navigation, and so on.

SUMMARY

In one aspect, the present invention provides a positioning method, comprising obtaining a scene image comprising image objects of a plurality of illumination sources, the scene image acquired by a positioning device; obtaining motion data of the positioning device during a motion; determining an estimated coordinate $(x_1, y_1, z_1)$ of the positioning device in a scene coordinate system o-xyz based on the motion data of the positioning device; determining an included angle $\alpha$ between an x-axis of the scene coordinate system o-xyz and an x'-axis of a positioning device coordinate system o'-x'y'z' based on the motion data of the positioning device; determining one or more reference vertex points based on the estimated coordinate $(x_1, y_1, z_1)$ of the positioning device; detecting in the scene image objects of one or more reference illumination sources of the plurality of illumination sources corresponding to the one or more reference vertex points; and determining a positioning coordinate $(x_{101}, y_{101}, z_{101})$ of the positioning device in the scene coordinate system o-xyz based on one or a combination of: (1) the estimated coordinate $(x_1, y_1, z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle $\alpha$.

Optionally, the motion data of the positioning device comprises a most recent data of a most recent positioning coordinate $(x_{101}, y_{101}, z_{101})'$ of the positioning device in the scene coordinate system o-xyz; a most recent data of a most recent included angle $\alpha'$ between the x-axis of the scene coordinate system o-xyz and a x'-axis of the positioning device coordinate system o'-x'y'z'; a present data of a present speed of the positioning device in the scene coordinate system o-xyz; a present data of a present acceleration of the positioning device in the scene coordinate system o-xyz; a rotation angle of the positioning device during a motion between a present moment and a previous moment, the previous moment being a moment the most recent data of the most recent positioning coordinate $(x_{101}, y_{101}, z_{101})'$ of the positioning device is determined; and a time duration between the present moment and the previous moment.

Optionally, determining the estimated coordinate $(x_1, y_1, z_1)$ of the positioning device in the scene coordinate system o-xyz comprises performing an inertial navigation positioning using the most recent positioning coordinate $(x_{101}, y_{101}, z_{101})'$ of the positioning device in the scene coordinate system o-xyz at the previous moment as a reference starting point, and based on a combination of: the present data of the present speed of the positioning device in the scene coordinate system o-xyz; the present data of the present acceleration of the positioning device in the scene coordinate system o-xyz; the rotation angle of the positioning device during the motion between the present moment and the previous moment; and the time duration between the present moment and the previous moment.

Optionally, determining the included angle $\alpha$ between the x-axis of the scene coordinate system o-xyz and the x'-axis of the positioning device coordinate system o'-x'y'z' based on the motion data of the positioning device comprises determining a relative rotation angle $\delta$ of a present position coordinate of the positioning device in the scene coordinate system o-xyz at the present moment with respect to a most recent position coordinate of the positioning device in the scene coordinate system o-xyz at the previous moment, based on the rotation angle of the positioning device during the motion between the present moment and the previous moment; and assigning a sum of the most recent included angle $\alpha$ and the relative rotation angle $\delta$ as the included angle $\alpha$ between the x-axis of the scene coordinate system o-xyz and the x'-axis of the positioning device coordinate system o'-x'y'z'.

Optionally, determining the one or more reference vertex points based on the estimated coordinate $(x_1, y_1, z_1)$ of the positioning device comprises obtaining a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and selecting N vertex points of the polygon grid as the one or more reference vertex points based on the estimated coordinate $(x_1, y_1, z_1)$ of the positioning device; wherein N≥1.

Optionally, the positioning method further comprises assigning the projections of the plurality of illumination sources on the xoy plane of the scene coordinate system o-xyz as the plurality of vertex points; and performing the polygonal division on the xoy plane of the scene coordinate system o-xyz based on the plurality of vertex points.

Optionally, selecting N vertex points of the polygon grid as the one or more reference vertex points based on the estimated coordinate $(x_1, y_1, z_1)$ of the positioning device comprises determining whether a projection of the positioning device on the xoy plane of the scene coordinate system o-xyz is in any polygon of the polygon grid based on the estimated coordinate $(x_1, y_1, z_1)$; assigning a polygon containing the projection of the positioning device on the xoy plane of the scene coordinate system o-xyz as a selected polygon based on a determination that the projection of the positioning device on the xoy plane of the scene coordinate system o-xyz is in one polygon of the polygon grid, and assigning vertex points of the selected polygon as the N vertex points; and assigning one of the plurality of vertex points within a shortest distance from the projection of the positioning device on the xoy plane of the scene coordinate system o-xyz as the N vertex points based on a determination that the projection of the positioning device on the xoy plane of the scene coordinate system o-xyz is not in any polygon of the polygon grid.

Optionally, the polygonal division is a triangulation; and wherein the polygonal division adopts Delaunay triangulation algorithm.

Optionally, detecting in the scene image the image objects of the one or more reference illumination sources of the plurality of illumination sources corresponding to the one or more reference vertex points is performed based on a reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'.

Optionally, detecting in the scene image the image objects of the one or more reference illumination sources of the plurality of illumination sources corresponding to the one or more reference vertex points comprises determining an estimated position of the one or more reference illumination sources of the plurality of illumination sources corresponding to the one or more reference vertex points in the scene image, based on the reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'; setting the estimated position of the one or more reference illumination sources of the plurality of illumination sources in the scene image as a center of a detecting circle having a threshold radius; and selecting image objects of one or more illumination sources of the plurality of illumination sources within the detecting circle having the threshold radius as the image objects of the one or more reference illumination sources of the plurality of illumination sources corresponding to the one or more reference vertex points.

Optionally, determining the positioning coordinate $(x_{101}, y_{101}, z_{101})$ of the positioning device in the scene coordinate system o-xyz is based on the positions of the image objects of the one or more reference illumination sources of the plurality of illumination sources in the scene image, the fixed coordinate positions $(x_0, y_0, z_0)$ of the one or more reference illumination sources of the plurality of illumination sources in the scene coordinate system o-xyz, and the included angle $\alpha$; the method comprises determining a pre-positioning coordinate $(x_{101p}, y_{101p}, z_{101p})$ of the positioning device in the scene coordinate system o-xyz based on each individual one of the positions of the image objects of the one or more reference illumination sources of the plurality of illumination sources in the scene image, each individual one of the fixed coordinate positions $(x_0, y_0, z_0)$ of the one or more reference illumination sources of the plurality of illumination sources in the scene coordinate system o-xyz, and the included angle $\alpha$; determining a coordinate $(r_x, r_y, r_z)$ of a position vector $\vec{r}$ in the positioning device coordinate system o'-x'y'z' for each individual one of the one or more reference illumination sources of the plurality of illumination sources in the scene image; wherein the pre-positioning coordinate $(x_{101p}, y_{101p}, z_{101p})$ of the positioning device in the scene coordinate system o-xyz is determined using the following equation $$(x_{101_p}, y_{101_p}) = (x_0, y_0) - (r_x, r_y) \bullet \begin{bmatrix} \cos\alpha & \sin\alpha \\ -\sin\alpha & \cos\alpha \end{bmatrix};$$

wherein $z_{101_p}$ is a normal distance h between point o' in the positioning device coordinate system o'-x'y'z' and a xoy plane of the scene coordinate system o-xyz.

Optionally, determining the coordinate $(r_x, r_y, r_z)$ of the position vector $\vec{r}$ in the positioning device coordinate system o'-x'y'z' for each individual one of the one or more reference illumination sources of the plurality of illumination sources in the scene image comprises determining an included angle $\varphi$ between the position vector $\vec{r}$ and an z'-axis of the positioning device coordinate system o'-x'y'z' based on the positions of the image objects of the one or more reference illumination sources of the plurality of illumination sources in the scene image; determining an included angle $\theta$ between a projection vector $\vec{r_H}$ and the x'-axis of the positioning device coordinate system o'-x'y'z' based on the positions of the image objects of the one or more reference illumination sources of the plurality of illumination sources in the scene image, the projection vector $\vec{r_H}$ being an orthographic projection of the position vector $\vec{r}$ on a x'o'y' plane of the positioning device coordinate system o'-x'y'z'; and determining the coordinate $(r_x, r_y, r_z)$ of the position vector $\vec{r}$ in the positioning device coordinate system o'-x'y'z' based on equation $(r_x, r_y, r_z) = (\tan\varphi\cos\theta, \tan\varphi\sin\theta, 1) \cdot |z_0 - h|$.

Optionally, in condition that there are multiple pre-positioning coordinates $(x_{101_p}, y_{101_p}, z_{101_p})$ of the positioning device in the scene coordinate system o-xyz, an average value $(x_{101_p}, y_{101_p}, z_{101_p})_m$ of the multiple pre-positioning coordinates $(x_{101_p}, y_{101_p}, z_{101_p})$ of the positioning device in the scene coordinate system o-xyz is assigned as the positioning coordinate $(x_{101}, y_{101}, z_{101})$ of the positioning device in the scene coordinate system o-xyz; and in condition that there only one pre-positioning coordinate $(x_{101_p}, y_{101_p}, z_{101_p})$ of the positioning device in the scene coordinate system o-xyz, the only one pre-positioning coordinate $(x_{101_p}, y_{101_p}, z_{101_p})$ of the positioning device in the scene coordinate system o-xyz is assigned as the positioning coordinate $(x_{101}, y_{101}, z_{101})$ of the positioning device in the scene coordinate system o-xyz.

Optionally, in condition that there are multiple pre-positioning coordinates $(x_{101_p}, y_{101_p}, z_{101_p})$ of the positioning device in the scene coordinate system o-xyz, the method further comprises calculating multiple included angles $\alpha$ respectively between the x-axis of the scene coordinate system o-xyz and the x'-axis of a positioning device coordinate system o'-x'y'z' based on the average value $(x_{101_p}, y_{101_p}, z_{101_p})_m$ of the multiple pre-positioning coordinates $(x_{101_p}, y_{101_p}, z_{101_p})$ of the positioning device in the scene coordinate system o-xyz, the coordinate $(r_x, r_y, r_z)$ of the position vector $\vec{r}$ for each individual one of the one or more reference illumination sources of the plurality of illumination sources in the positioning device coordinate system o'-x'y'z', and the fixed coordinate positions $(x_0, y_0, z_0)$ of the one or more reference illumination sources of the plurality of illumination sources in the scene coordinate system o-xyz; calculating an average value $\alpha_m$ of the multiple included angles $\alpha$ between the x-axis of the scene coordinate system o-xyz and the x'-axis of a positioning device coordinate system o'-x'y'z'; and assigning the average value $\alpha_m$ of the multiple included angles $\alpha$ as an accurate included angle between the x-axis of the scene coordinate system o-xyz and the x'-axis of a positioning device coordinate system o'-x'y'z'.

Optionally, an origin point o of the scene coordinate system o-xyz is on ground; a z-axis of the scene coordinate system o-xyz is substantially parallel to an optical axis of a camera in the positioning device; the scene image is captured by the camera of the positioning device; the optical axis of the camera of the positioning device is substantially perpendicular to the ground; an origin point o' of the positioning device coordinate system o'-x'y'z' is on the camera of the positioning device; and a z'-axis of the positioning device coordinate system o'-x'y'z' substantially overlaps with the optical axis of the camera of the positioning device.

Optionally, the positioning method further comprises receiving data of the fixed coordinate positions $(x_0, y_0, z_0)$ of the one or more reference illumination sources of the plurality of illumination sources in the scene coordinate system o-xyz.

Optionally, the positioning method further comprises measuring a normal distance h between an origin point o' of the positioning device coordinate system o'-x'y'z' and ground.

Optionally, the positioning method further comprises assigning the estimated coordinate $(x_1,y_1,z_1)$ of the positioning device in a scene coordinate system o-xyz as the positioning coordinate $(x_{101},y_{101},z_{101})$ of the positioning device in the scene coordinate system o-xyz in condition that no illumination source is detected; and determining the positioning coordinate $(x_{101},y_{101},z_{101})$ of the positioning device in the scene coordinate system o-xyz based on the positions of the image objects of the one or more reference illumination sources of the plurality of illumination sources in the scene image, the fixed coordinate positions $(x_0, y_0, z_0)$ of the plurality of illumination sources in the scene coordinate system o-xyz, and the included angle $\alpha$.

In another aspect, the present invention provides a positioning apparatus, comprising a camera configured to obtain a scene image comprising image objects of a plurality of illumination sources, the scene image acquired by a positioning device; an inertial measuring device configured to obtain motion data of the positioning device; a memory; and one or more processors; wherein the memory and the one or more processors are connected with each other; and the memory stores computer-executable instructions for controlling the one or more processors to determine an estimated coordinate $(x_1,y_1,z_1)$ of the positioning device in a scene coordinate system o-xyz based on the motion data of the positioning device; determine an included angle $\alpha$ between an x-axis of the scene coordinate system o-xyz and an x'-axis of a positioning device coordinate system o'-x'y'z' based on the motion data of the positioning device; determine one or more reference vertex points based on the estimated coordinate $(x_1,y_1,z_1)$ of the positioning device; detect in the scene image image objects of one or more reference illumination sources of the plurality of illumination sources corresponding to the reference vertex points; and determine a positioning coordinate $(x_{101},y_{101},z_{101})$ of the positioning device in the scene coordinate system o-xyz based on one or a combination of: (1) the estimated coordinate $(x_1,y_1,z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle $\alpha$.

Optionally, the inertial measuring device comprise one device selected from a group consisting of a triaxial angular velocity sensor and a three-axis magnetic field sensor; and an acceleration sensor; wherein the motion data of the positioning device comprises a most recent data of a most recent positioning coordinate $(x_{101},y_{101},z_{101})'$ of the positioning device in the scene coordinate system o-xyz; a most recent data of a most recent included angle $\alpha'$ between the x-axis of the scene coordinate system o-xyz and a first x'-axis of the positioning device coordinate system o'-x'y'z'; a present data of a present speed of the positioning device in the scene coordinate system o-xyz; a present data of a present acceleration of the positioning device in the scene coordinate system o-xyz; a rotation angle of the positioning device during a motion between a present moment and a previous moment when the most recent data of the most recent positioning coordinate $(x_{101},y_{101},z_{101})'$ of the positioning device and the most recent data of the most recent included angle $\alpha'$ are determined; and a time duration between the present moment and the previous moment.

Optionally, in condition that there are multiple pre-positioning coordinates $(x_{101_p},y_{101_p},z_{101_p})$ of the positioning device in the scene coordinate system o-xyz, an average value $(x_{101_p},y_{101_p},z_{101_p})_m$ of the multiple pre-positioning coordinates $(x_{101_p},y_{101_p},z_{101_p})$ of the positioning device in the scene coordinate system o-xyz is assigned as the positioning coordinate $(x_{101},y_{101},z_{101})$ of the positioning device in the scene coordinate system o-xyz; wherein the memory further stores computer-executable instructions for controlling the one or more processors to calibrate the motion data of the positioning device obtained by the inertial measuring device; and assign the average value $(x_{101_p},y_{101_p},z_{101_p})_m$ of the multiple pre-positioning coordinates $(x_{101_p},y_{101_p},z_{101_p})$ of the positioning device in the scene coordinate system o-xyz as the positioning coordinate $(x_{101},y_{101},z_{101})$ of the positioning device in the scene coordinate system o-xyz.

Optionally, the memory further stores computer-executable instructions for controlling the one or more processors to calculate multiple included angles $\alpha$ respectively between the x-axis of the scene coordinate system o-xyz and the x'-axis of a positioning device coordinate system o'-x'y'z' based on the average value $(x_{101_p},y_{101_p},z_{101_p})_m$ of the multiple pre-positioning coordinates $(x_{101_p},y_{101_p},z_{101_p})$ of the positioning device in the scene coordinate system o-xyz, the coordinate $(r_x, r_y, r_z)$ of a position vector $\vec{r}$ for each individual one of the one or more reference illumination sources of the plurality of illumination sources in the positioning device coordinate system o'-x'y'z', and the fixed coordinate positions $(x_0, y_0, z_0)$ of the one or more reference illumination sources of the plurality of illumination sources in the scene coordinate system o-xyz; calculate an average value $\alpha_m$ of the multiple included angles $\alpha$ between the x-axis of the scene coordinate system o-xyz and the x'-axis of a positioning device coordinate system o'-x'y'z'; and assign the average value $\alpha_m$ of the multiple included angles $\alpha$ as an accurate included angle between the x-axis of the scene coordinate system o-xyz and the x'-axis of a positioning device coordinate system o'-x'y'z'.

Optionally, the memory further stores computer-executable instructions for controlling the one or more processors to assign a plurality of projections of the plurality of illumination sources on a xoy plane of the scene coordinate system o-xyz as vertex points; obtain a polygon grid by performing a polygonal division on a xoy plane of the scene coordinate system o-xyz based on a plurality of vertex points, the plurality of vertex points being projections of the plurality of illumination sources on the xoy plane of the scene coordinate system o-xyz; and select N vertex points of the polygon grid as the one or more reference vertex points based on the estimated coordinate $(x_1,y_1,z_1)$ of the positioning device; wherein N≥1.

Optionally, the positioning device further comprises a receiver configured to receive information about the polygon grid.

In another aspect, the present invention provides a computer-program product comprising a non-transitory tangible computer-readable medium having computer-readable instructions thereon, the computer-readable instructions being executable by a processor to cause the processor to perform obtaining a scene image comprising image objects of a plurality of illumination sources, the scene image acquired by a positioning device; obtaining motion data of the positioning device during a motion; determining an estimated coordinate $(x_1,y_1,z_1)$ of the positioning device in a scene coordinate system o-xyz based on the motion data of the positioning device; determining an included angle α between an x-axis of the scene coordinate system o-xyz and an x'-axis of a positioning device coordinate system o'-x'y'z' based on the motion data of the positioning device; determining one or more reference vertex points based on the estimated coordinate $(x_1,y_1,z_1)$ of the positioning device; detect in the scene image image objects of one or more reference illumination sources of the plurality of illumination sources corresponding to the one or more reference vertex points; and determining a positioning coordinate $(x_{101},y_{101},z_{101})$ of the positioning device in the scene coordinate system o-xyz based on one or a combination of: (1) the estimated coordinate $(x_1, y_1, z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle α.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Typically, indoors positioning technique uses visible light in positioning. However, the positioning technique using visible light requires an illumination sources having communication function. In order to perform indoors positioning using visible light, the illumination sources have to be equipped with wireless communication devices. Alternatively, the illumination sources are ones capable of sending specific signals by changing parameters such as brightness of the illumination sources, colors of the illumination sources or the ranges of spectrum of the illumination sources. However, it is costlier to make the illumination sources having communication function or to replace conventional illumination sources.

Accordingly, the present disclosure provides, inter alia, a positioning method, a positioning apparatus, and computer-program product that substantially obviate one or more of the problems due to limitations and disadvantages of the related art. In one aspect, the method did not require the illumination sources to be equipped with communication function, which may reduce the cost of indoors positioning.

Figure 1:
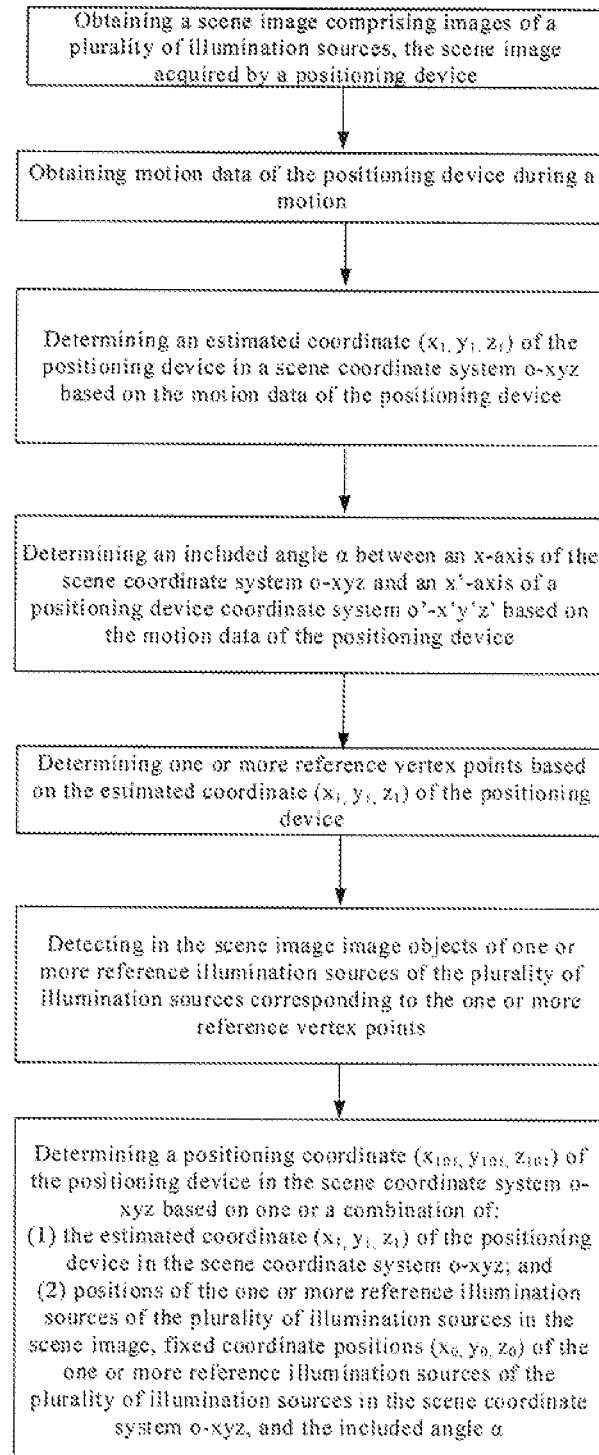
FIG. 1 is a flow chat illustrating a positioning method in some embodiments according to the present disclosure.

FIG. 1 is a flow chat illustrating a positioning method in some embodiments according to the present disclosure. Referring to FIG. 1, a positioning method includes obtaining a scene image including image objects of a plurality of illumination sources. Optionally, the scene image is acquired by a positioning device.

Figure 2:
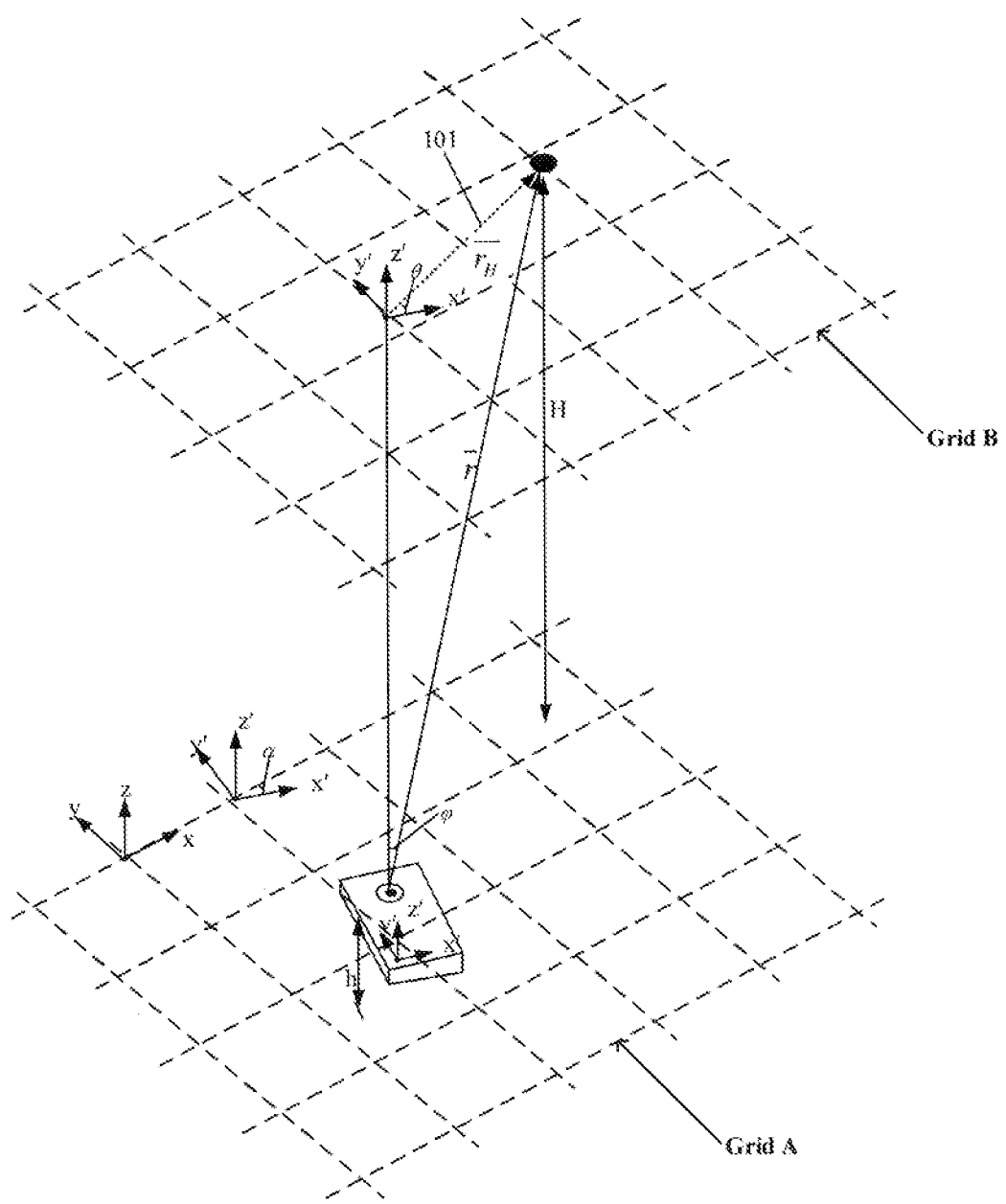
FIG. 2 is a schematic diagram illustrating a relationship between a scene coordinate system and a positioning device coordinate system in some embodiments according to the present disclosure.

FIG. 2 is a schematic diagram illustrating a relationship between a scene coordinate system and a positioning device coordinate system in some embodiments according to the present disclosure. FIG. 2 shows a perspective view illustrating an indoor space where the positioning device moves. A grid A shows the ground area of the indoor space. A grid B shows a ceiling of the indoor space. Optionally, the plurality of illumination sources are installed on the ceiling of the indoor space (e.g. the grid B), therefore, normal distances H between each individual one of the plurality of illumination sources and the ground area of the indoor space (e.g. the grid A) are known when the plurality of illumination sources are installed. Optionally, the normal distances H between each individual one of the plurality of illumination sources and the ground area of the indoor space (e.g. the grid A) can be measured. Optionally, the information about a map of the indoor space and information about positions of the plurality of illumination sources is stored in the positioning device. Optionally, the information about the map of the indoor space and information about positions of the plurality of illumination sources can be measured in real time. Optionally, the information about the map of the indoor space and information about positions of the plurality of illumination sources is received from other information sources.

Referring to both FIG. 1 and FIG. 2, the scene image including image objects of the plurality of illumination sources is acquired by directing the positioning device upwards to capture an image of the grid B.

Figure 3:
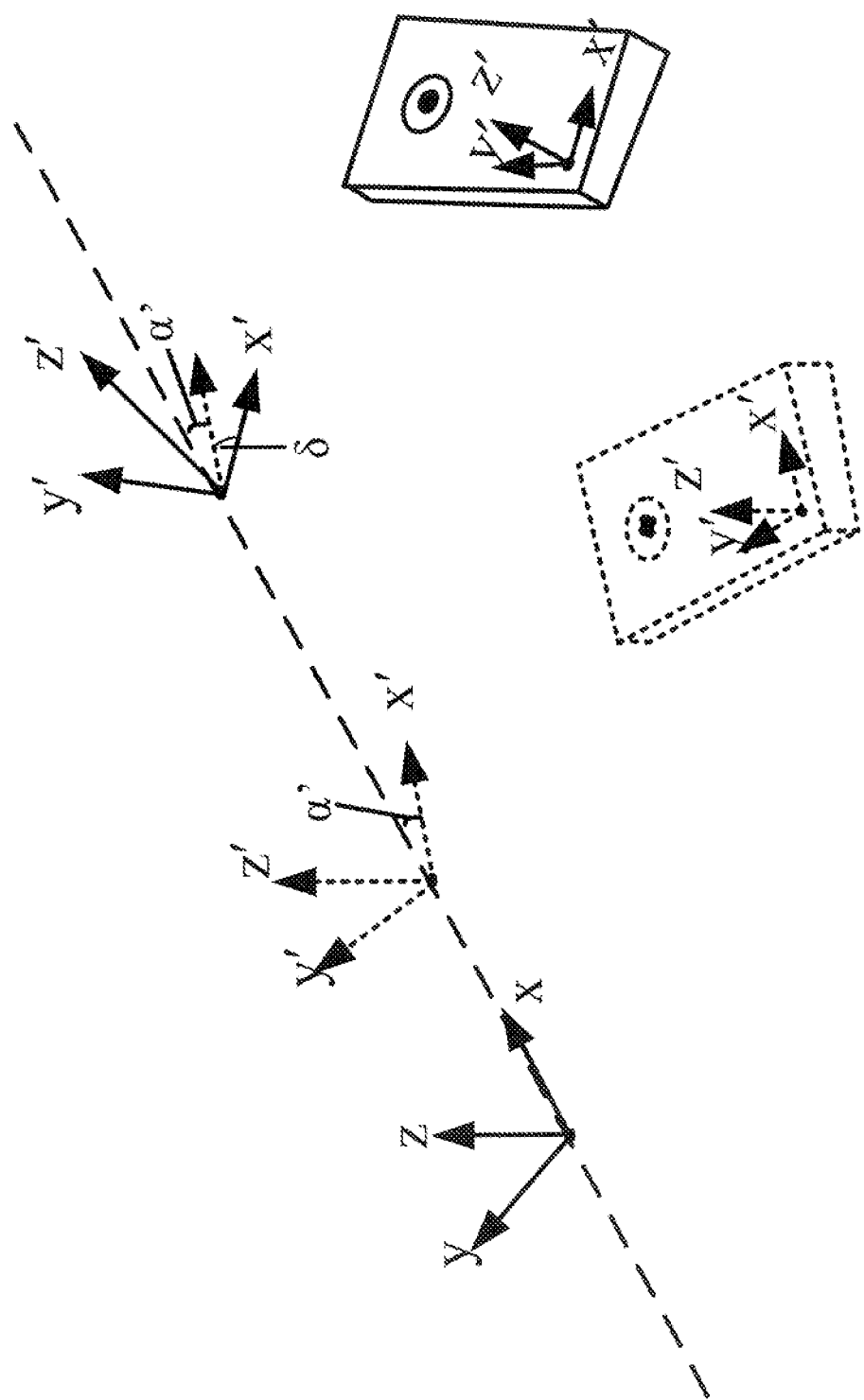
FIG. 3 is a schematic diagram illustrating a relationship between a present position coordinate of the positioning device in the scene coordinate system at the present moment and a most recent position coordinate of the positioning device in the scene coordinate system at the previous moment.

FIG. 3 is a schematic diagram illustrating a relationship between a present position coordinate of a positioning device in a scene coordinate system at a present moment and a most recent position coordinate of the positioning device in the scene coordinate system at a previous moment. Referring to both FIG. 1, the positioning method further includes obtaining motion data of the positioning device during a motion. Optionally, the motion data of the positioning device during the motion includes a most recent data of a most recent positioning coordinate $(x_{101}, y_{101}, z_{101})'$ of the positioning device in the scene coordinate system o-xyz, a most recent data of a most recent included $\alpha'$ between the x-axis of the scene coordinate system o-xyz and a x'-axis of the positioning device coordinate system o'-x'y'z', a present data of a present speed of the positioning device in the scene coordinate system o-xyz, a present data of a present acceleration of the positioning device in the scene coordinate system o-xyz, a rotation angle of the positioning device during the motion between a present moment and a previous moment (the previous moment being a moment the most recent data of the most recent positioning coordinate $(x_{101}, y_{101}, z_{101})'$ of the positioning device and the most recent data of the most recent included angle $\alpha'$ is determined) and a time duration between the present moment and the previous moment. Referring to FIG. 3, a rectangular structure drawn with dotted lines and a coordinate system o'-x'y'z' drawn with dotted line shows the status of the positioning device in the previous moment. A rectangular structure drawn with solid lines and a coordinate system o'-x'y'z' drawn with solid line shows the status of the positioning device in the present moment. A coordinate system o-xyz drawn with solid line is the scene coordinate system o-xyz.

The most recent data of the most positioning coordinate $(x_{101}, y_{101}, z_{101})'$ of the positioning device in the scene coordinate system o-xyz, and the most recent data of the most recent included $\alpha'$ between the x-axis of the scene coordinate system o-xyz and the x'-axis of the positioning device coordinate system o'-x'y'z' are obtained at the previous moment. The present data of the present speed of the positioning device in the scene coordinate system o-xyz, the present data of the present acceleration of the positioning device in the scene coordinate system o-xyz, and the rotation angle of the positioning device during the motion between a present moment and a previous moment are obtained during the motion between the present moment and the previous moment. The time duration between the present moment and the previous moment is a fixed time period. Therefore, the positioning device performs positioning once every fixed time period. Optionally, the time duration between the present moment and the previous moment can be measured in real time.

Referring to FIG. 1, the positional method further includes determining an estimated coordinate $(x_1, y_1, z_1)$ of the positioning device in the scene coordinate system o-xyz based on the motion data of the positioning device. Optionally, the estimated coordinate $(x_1, y_1, z_1)$ of the positioning device in the scene coordinate system o-xyz is determined by performing an inertial navigation positioning using the most recent positioning coordinate $(x_{101}, y_{101}, z_{101})'$ of the positioning device in the scene coordinate system o-xyz at the previous moment as a reference starting point and based on a combination of most recent data of the most positioning coordinate (x101, y101, z101)' of the positioning device in the scene coordinate system o-xyz, the present data of the present speed of the positioning device in the scene coordinate system o-xyz, the present data of the present acceleration of the positioning device in the scene coordinate system o-xyz, the rotation angle of the positioning device during the motion between the present moment and the previous moment, and the time duration between the present moment and the previous moment.

Referring to FIG. 1, the positional method further includes determining an included angle $\alpha$ between the x-axis of the scene coordinate system o-xyz and the x'-axis of the positioning device coordinate system o'-x'y'z' based on the motion data of the positioning device. Optionally, referring to FIG. 2, the scene coordinate system o-xyz defines the indoor space. An origin point o of the scene coordinate system o-xyz is on ground. A z-axis of the scene coordinate system o-xyz is perpendicular to a xoy plane of the scene coordinate system o-xyz. A positioning coordinate $(x_{101}, y_{101}, z_{101})$ of the positioning device is described under the scene coordinate system o-xyz. Optionally, the scene coordinate system o-xyz is a space rectangular coordinate system. Optionally, the positioning device coordinate system o'-x'y'z' is a coordinate system subsidiary to the scene coordinate system o-xyz. Optionally, the scene image is captured by a camera of the positioning device. Optionally, an optical axis of the camera of the positioning device is substantially perpendicular to the ground. Optionally, an origin point o' of the positioning device coordinate system o'-x'y'z' is on the camera of the positioning device. Optionally, a z'-axis of the positioning device coordinate system o'-x'y'z' substantially overlaps with the optical axis of the camera of the positioning device. The coordinates on the positioning device coordinate system o'-x'y'z' do not change when the positioning device moves. Optionally, a normal distance h between the origin point o' of the positioning device coordinate system o'-x'y'z' and ground is known before the installment of the positioning device. Optionally, the normal distance h between the origin point o' of the positioning device coordinate system o'-x'y'z' and the ground can be measured in real time. Optionally, the positioning device coordinate system o'-x'y'z' is a space rectangular coordinate system.

Referring to FIG. 3, in some embodiments, determining the included angle $\alpha$ between the x-axis of the scene coordinate system o-xyz and the x'-axis of the positioning device coordinate system o'-x'y'z' includes determining a relative rotation angle $\delta$ of the present position coordinate of the positioning device in the scene coordinate system o-xyz at the present moment with respect to the most recent position coordinate of the positioning device in the scene coordinate system o-xyz at the previous moment, based on the rotation angle of the positioning device during the motion between the present moment and the previous moment. Optionally, the relative rotation angle $\delta$ can be measured by an inertial measuring device measuring the angle of rotation of the positioning device around a vertical axis of the positioning device. Optionally, the relative rotation angle $\delta$ can be measured with changes of the magnetic field of the earth. In one example, the most recent position coordinate of the positioning device in the scene coordinate system o-xyz is assigned as the reference start position, the angle that the positioning device rotates from the reference start position during the movement between the present moment and the previous moment is the relative rotation angle $\delta$. In some embodiments, determining the included angle $\alpha$ between the x-axis of the scene coordinate system o-xyz and the x'-axis of the positioning device coordinate system o'-x'y'z' includes assigning a sum of the most recent included angle $\alpha'$ and the relative rotation angle $\delta$ as the included angle $\alpha$ between the x-axis of the scene coordinate system o-xyz and the x'-axis of the positioning device coordinate system o'-x'y'z'. In one example, the included angle α between the x-axis of the scene coordinate system o-xyz and the x'-axis of the positioning device coordinate system o'-x'y'z' at the present moment is the sum of a value of an angle between the x-axis of the scene coordinate system o-xyz and the x'-axis of the positioning device coordinate system o'-x'y'z' at the previous moment, and a value of the relative rotation angle δ.

Referring to FIG. 1, the positioning method further includes determining one or more reference vertex points based on the estimated coordinate $(x_1, y_1, z_1)$ of the positioning device. In some embodiments, determining one or more reference vertex points based on the estimated coordinate $(x_1, y_1, z_1)$ of the positioning device includes obtaining a polygon grid derived from a polygonal division on the xoy plane of the scene coordinate system o-xyz based on a plurality of vertex points. Optionally, projections of the plurality of illumination sources on the xoy plane of the scene coordinate system o-xyz are assigned as the plurality of vertex points are. Optionally, the polygon grid is obtained from other information sources. In one example, the information of the polygon grid can be stored in the positioning device (e.g. a memory). In another example, the information of the polygon grid is obtained though communication between the positioning device and other information sources. In one example, one or more of the plurality of illumination sources on the ceiling cannot illuminate, therefore, they cannot be detected in the scene image, or one or more of the plurality of illumination sources are added on the ceiling, the polygon grid should be renewed at any time by communicating with other information sources. In another example, a memory further storing computer-executable instructions controls one or more processors to receive renewed information about the polygon grid. In some embodiments, determining one or more reference vertex points based on the estimated coordinate $(x_1, y_1, z_1)$ of the positioning device includes selecting N vertex points of the polygon grid as the one or more reference vertex points based on the estimated coordinate $(x_1, y_1, z_1)$ of the positioning device. Optionally, N≥1. In some embodiments, whether the projection of the positioning device on the xoy plane of the scene coordinate system is in any polygon of the polygon grid based on the estimated coordinate $(x_1, y_1, z_1)$ should be determined. Optionally, on a determination that the projection of the positioning device on the xoy plane of the scene coordinate system is in one polygon of the polygon grid, a polygon containing the projection of the positioning device on the xoy plane of the scene coordinate system is assigned as a selected polygon. And vertex points of the selected polygon are assigned as the N vertex points. In another example, on a determination that the projection of the positioning device on the xoy plane of the scene coordinate system is not in any polygon of the polygon grid, one of the plurality of vertex points within a shortest distance from the projection of the positioning device on the xoy plane of the scene coordinate system is assigned as the N vertex point. In some embodiments, the polygonal division performed before obtaining the polygon grid is a triangulation, therefore, a plurality of polygons of the polygon grid are triangle. Optionally, the triangulation adopts Delaunay triangulation algorithm. The result of the triangulation using Delaunay triangulation algorithm is unique. The result of the triangulation using Delaunay triangulation algorithm can minimize the situation that the positions of the plurality of illumination sources is close to the edge of the vision of the camera, which may reduce errors.

Referring to FIG. 1, the positional method further includes detecting in the scene image objects of one or more reference illumination sources of the plurality of illumination sources corresponding to the one or more reference vertex points. Optionally, the one or more reference vertex points are the projection of one or more reference illumination sources of the plurality of illumination sources on ground. Optionally, each individual one of the one more reference vertex points corresponds to a respective one of the one or more reference illumination sources of the plurality of illumination sources. Optionally, subsequent to parallel moving the one or more reference vertex points along a direction of z-axis of the scene coordinate system o-xyz, the one or more reference vertex points substantially overlaps with the one or more reference illumination sources of the plurality of illumination source. In some embodiments, the image objects of one or more reference illumination sources of the plurality of illumination sources are detected in the scene image based on the reference coordinate $(x_0, y_0, 0)$ of one of the reference vertex points and the included angle α between the x-axis of the scene coordinate system o-xyz and the x'-axis of a positioning device coordinate system o'-x'y'z'. Optionally, an estimated position of the reference illumination sources of the plurality of illumination sources corresponding to the one or more reference vertex points in the scene image is determined, based on the reference coordinate $(x_0, y_0, 0)$ of one of the reference vertex points and the included angle α between the x-axis of the scene coordinate system o-xyz and the x'-axis of a positioning device coordinate system o'-x'y'z'. Optionally, the estimated position of the reference illumination sources of the plurality of illumination sources in the scene image is set as a center of a detecting circle having a threshold radius. Optionally, image objects of one or more illumination sources of the plurality of illumination sources within the detecting circle having the threshold radius are selected as the image objects of reference illumination sources of the plurality of illumination sources corresponding to the one or more reference vertex points.

Referring to FIG. 1, the positioning method further includes determining a positioning coordinate $(x_{101}, y_{101}, z_{101})$ of the positioning device in the scene coordinate system o-xyz based on one or a combination of: (1) the estimated coordinate $(x_1, y_1, z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle α. Optionally, the fixed coordinate positions $(x_0, y_0, z_0)$ of the one or more reference illumination sources of the plurality of illumination sources in the scene coordinate system o-xyz is stored in the positioning device. Optionally, the fixed coordinate positions $(x_0, y_0, z_0)$ of the one or more reference illumination sources of the plurality of illumination sources in the scene coordinate system o-xyz is received from other devices in real time. When there is no change about the plurality of illumination sources, the stored information about the fixed coordinate positions $(x_0, y_0, z_0)$ of the one or more reference illumination sources of the plurality of illumination sources in the scene coordinate system o-xyz is sufficient to perform positioning. When the number of the plurality of the illumination sources increases or there is change about the plurality of illumination sources, updated information about the plurality of illumination sources can be received by a receiver via wireless communication or wire communication. Various appropriate methods may be used for measuring fixed coordinate positions ($x_0$, $y_0$, $z_0$) of the one or more reference illumination sources of the plurality of illumination sources in the scene coordinate system o-xyz. Examples of methods for measuring fixed coordinate positions ($x_0$, $y_0$, $z_0$) of the one or more reference illumination sources of the plurality of illumination sources in the scene coordinate system o-xyz include, but not limited to, a measurement using triangle, a measurement using ruler, a measurement using rangefinder, and a measurement on construction and renovation drawings. Optionally, in condition that no reference illumination sources of the plurality of illumination sources is detected in the scene image, the estimated coordinate ($x_1$, $y_1$, $z_1$) of the positioning device in the scene coordinate system o-xyz is assigned as the positioning coordinate ($x_{101}$, $y_{101}$, $z_{101}$) of the positioning device in the scene coordinate system o-xyz. Optionally, in condition that image objects of one or more reference illumination sources of the plurality of illumination sources are detected in the scene image, the positioning coordinate ($x_{101}$, $y_{101}$, $z_{101}$) of the positioning device in the scene coordinate system o-xyz is determined based on positions of the image objects of the one or more reference illumination sources of the plurality of illumination sources in the scene image, fixed coordinate positions ($x_0$, $y_0$, $z_0$) of the one or more reference illumination sources of the plurality of illumination sources in the scene coordinate system o-xyz, and the included angle α.

In some embodiments, determining a positioning coordinate ($x_{101}$, $y_{101}$, $z_{101}$) of the positioning device in the scene coordinate system o-xyz further includes determining a pre-positioning coordinate ($x_{101p}$, $y_{101p}$, $z_{101p}$) of the positioning device in the scene coordinate system o-xyz based on each individual one of the positions of the image objects of the one or more reference illumination sources of the plurality of illumination sources in the scene image, each individual one of the fixed coordinate positions ($x_0$, $y_0$, $z_0$) of the one or more reference illumination sources of the plurality of illumination sources in the scene coordinate system o-xyz, and the included angle α. Optionally, in condition that only one image object of one or more reference illumination sources of the plurality of illumination sources is detected in the scene image, only one pre-positioning coordinate ($x_{101p}$, $y_{101p}$, $z_{101p}$) of the positioning device in the scene coordinate system o-xyz is obtained. Optionally, in condition that multiple image objects of one or more reference illumination sources of the plurality of illumination sources are detected in the scene image, multiple pre-positioning coordinates ($x_{101p}$, $y_{101p}$, $z_{101p}$) of the positioning device in the scene coordinate system o-xyz are obtained. The number of the multiple image objects of one or more reference illumination sources of the plurality of illumination sources detected equals to the number of multiple pre-positioning coordinates ($x_{101p}$, $y_{101p}$, $z_{101p}$) of the positioning device in the scene coordinate system o-xyz obtained.

In some embodiments, determining a positioning coordinate ($x_{101}$, $y_{101}$, $z_{101}$) of the positioning device in the scene coordinate system o-xyz further includes determining a coordinate ($r_x$, $r_y$, $r_z$) of a position vector $\vec{r}$ in the positioning device coordinate system o'-x'y'z' for each individual one of the one or more reference illumination sources of the plurality of illumination sources in the scene image. Optionally, determining the coordinate ($r_x$, $r_y$, $r_z$) of the position vector $\vec{r}$ in the positioning device coordinate system o'-x'y'z' includes determining an included angle φ between the position vector $\vec{r}$ and an z'-axis of the positioning device coordinate system o'-x'y'z' based on each individual one of the positions of the image objects of the one or more reference illumination sources of the plurality of illumination sources in the scene image, and determining an included angle θ between a projection vector $\vec{r}_H$ and the x'-axis of the positioning device coordinate system o'-x'y'z' based on the positions of each individual one of the one or more reference illumination sources of the plurality of illumination sources in the scene image. Optionally, the projection vector $\vec{r}_H$ being an orthographic projection of the position vector $\vec{r}$ on the x'o'y' plane of the positioning device coordinate system o'-x'y'z'. For example, since the optical parameters and image sensor parameters of the camera is known or readable at any time, a relative direction of an image objects in an image to the camera can be calculated based on the image took by the camera. Optionally, the coordinate ($r_x$, $r_y$, $r_z$) of the position vector $\vec{r}$ in the positioning device coordinate system o'-x'y'z' is determined based on equation: ($r_x$, $r_y$, $r_z$)=(tan φ cos θ, tan φ sin θ, 1)·|$z_0$–h|; wherein $S_{101}$=|H–h|·tan φ, $r_x$=|H–h|·tan φ·cos θ, $r_y$=|H–h|·tan φ·sin θ, $r_z$=|H–h|, referring to FIG. 2, a black dot on grid B is one of the positions of the image objects of the one or more reference illumination sources of the plurality of illumination sources, an rectangular structure is the positioning device, a distance H is a normal distance between the one of the positions of the image objects of the one or more reference illumination sources of the plurality of illumination sources and the ground, a distance h is a normal distance between point o' in the positioning device coordinate system o'-x'y'z' and the xoy plane of the scene coordinate system o-xyz, and $S_{101}$ is the length of the projection vector $\vec{r}_H$. Optionally, the coordinate of the projection vector $\vec{r}_H$ is ($r_{Hx}$, $r_{Hy}$, $r_{Hz}$), therefore, ($r_{Hx}$,$r_{Hy}$,0)=(tan φ cos θ,tan φ sin θ,0)·|H–h|.

In some embodiments, determining a positioning coordinate ($x_{101}$, $y_{101}$, $z_{101}$) of the positioning device in the scene coordinate system o-xyz further includes determining the pre-positioning coordinate ($x_{101p}$, $y_{101p}$, $z_{101p}$) of the positioning device in the scene coordinate system o-xyz using the following equation:

$$(x_{101_p}, y_{101_p}) = (x_0, y_0) - (r_x, r_y) \bullet \begin{bmatrix} \cos\alpha & \sin\alpha \\ -\sin\alpha & \cos\alpha \end{bmatrix};$$

wherein $z_{101_p}$ is the normal distance h between point o' in the positioning device coordinate system o'-x'y'z' and the xoy plane of the scene coordinate system o-xyz. Optionally, the normal distance h can be measured. Optionally, the normal distance h can be a fixed value determined when the positioning device is installed or fixed. Optionally, the normal distance h can be measured by a height measuring unit. Various appropriate devices may be used for measuring the normal distance h. Examples of devices suitable for measuring the normal distance h include, but not limited to, infrared ranging devices, laser ranging devices, ranging devices based on atmospheric pressure, In some embodiments, the above equation is described with the coordinate ($r_{Hx}$, $r_{Hy}$, $r_{Hz}$) of the projection vector $\vec{r}_H$ as follows:

$$(x_{101_p}, y_{101_p}) = (x_0, y_0) - (r_{Hx}, r_{Hy}) \bullet \begin{bmatrix} \cos\alpha & \sin\alpha \\ -\sin\alpha & \cos\alpha \end{bmatrix};$$

In some embodiments, determining a positioning coordinate ($x_{101}, y_{101}, z_{101}$) of the positioning device in the scene coordinate system o-xyz further includes assigning one of the pre-positioning coordinates ($x_{101p}, y_{101p}, z_{101p}$) of the positioning device in the scene coordinate system o-xyz as the positioning coordinate ($x_{101}, y_{101}, z_{101}$) of the positioning device in the scene coordinate system o-xyz. Optionally, determining a positioning coordinate ($x_{101}, y_{101}, z_{101}$) of the positioning device in the scene coordinate system o-xyz further includes further processing the multiple pre-positioning coordinates ($x_{101p}, y_{101p}, z_{101p}$) of the positioning device in the scene coordinate system o-xyz. Optionally, an average value ($x_{101p}, y_{101p}, z_{101p}$)$_m$ of the multiple pre-positioning coordinates ($x_{101p}, y_{101p}, z_{101p}$) of the positioning device in the scene coordinate system o-xyz is assigned as the positioning coordinate ($x_{101}, y_{101}, z_{101}$) of the positioning device in the scene coordinate system o-xyz. Optionally, in condition that multiple (e.g. 2 or 3) image objects of one or more reference illumination sources of the plurality of illumination sources are detected in the scene image acquired by the camera, the fixed coordinate positions ($x_0, y_0, z_0$) of the one or more reference illumination sources of the plurality of illumination sources in the scene coordinate system o-xyz is ($x_0, y_0, z_0$)$_k$, k=1, 2, . . . , N, therefore, the multiple pre-positioning coordinates ($x_{101p}, y_{101p}, z_{101p}$) are calculated and presented by ($x_{101p}, y_{101p}, z_{101p}$)$_k$, k=1, 2, . . . , N, subsequently, the average value ($x_{101p}, y_{101p}, z_{101p}$)$_m$ of the multiple pre-positioning coordinates ($x_{101p}, y_{101p}, z_{101p}$) of the positioning device in the scene coordinate system o-xyz is calculated and assigned as the positioning coordinate ($x_{101}, y_{101}, z_{101}$) of the positioning device in the scene coordinate system o-xyz. Various appropriate methods may be used to calculate the average value ($x_{101p}, y_{101p}, z_{101p}$)$_m$. Examples of methods suitable for calculating the average value include, but not limited to, a vector averaging method, a weighted average method, a circular average method, and a least square method. Optionally, the least square method is used to find an average value ($x_{101p}, y_{101p}, z_{101p}$)$_m$ so that the value of $$\sum_{k=1}^{N} \left( \left| (x_{101_p}, y_{101_p}, z_{101_p})_m - (x_{101_p}, y_{101_p}, z_{101_p})_k \right|^2 \right)$$

is minimum. Optionally, the average value ($x_{101p}, y_{101p}, z_{101p}$)$_m$ of the multiple pre-positioning coordinates ($x_{101p}, y_{101p}, z_{101p}$) of the positioning device in the scene coordinate system o-xyz can be used to calibrate the horizontal acceleration measurement of the positioning equipment and to diminish the cumulative error of the horizontal acceleration measurement of the positioning of the equipment.

In some embodiments, in order to reduce the cumulative error of an inertial measuring device, multiple included angles $\alpha$ respectively between the x-axis of the scene coordinate system o-xyz and the x'-axis of a positioning device coordinate system o'-x'y'z' is calculated based on the average value ($x_{101p}, y_{101p}, z_{101p}$)$_m$ of the multiple pre-positioning coordinates ($x_{101p}, y_{101p}, z_{101p}$) of the positioning device in the scene coordinate system o-xyz, the coordinate ($r_x, r_y, r_z$) of the position vector $\vec{r}$ for each individual one of the one or more reference illumination sources of the plurality of illumination sources in the positioning device coordinate system o'-x'y'z', and the fixed coordinate positions ($x_0, y_0, z_0$) of the one or more reference illumination sources of the plurality of illumination sources in the scene coordinate system o-xyz. For example, multiple included angles $\alpha$ respectively between the x-axis of the scene coordinate system o-xyz and the x'-axis of a positioning device coordinate system o'-x'y'z' is calculated based on the average value ($x_{101p}, y_{101p}, z_{101p}$)$_m$ of the multiple pre-positioning coordinates ($x_{101p}, y_{101p}, z_{101p}$) of the positioning device in the scene coordinate system o-xyz, the fixed coordinate positions ($x_0, y_0, z_0$) of the one or more reference illumination sources of the plurality of illumination sources in the scene coordinate system o-xyz, e.g. ($x_0, y_0, z_0$)$_k$, k=1, 2, . . . , N, and the included angle $\theta$ between the projection vector $\vec{r}_H$ and the x'-axis of the positioning device coordinate system o'-x'y'z', e.g. $\theta_k$, k=1, 2, . . . , N. Optionally, in order to reduce the cumulative error of the inertial measuring device, an average value $\alpha_m$ of the multiple included angles $\alpha$ between the x-axis of the scene coordinate system o-xyz and the x'-axis of a positioning device coordinate system o'-x'y'z' is calculated. Optionally, in order to reduce the cumulative error of the inertial measuring device, the average value $\alpha_m$ of respectively multiple included angles $\alpha$ is assigned as an accurate included angle between the x-axis of the scene coordinate system o-xyz and the x'-axis of a positioning device coordinate system o'-x'y'z'. For example, before calculating the next position of the positioning device, the included angle $\alpha$ between the x-axis of the scene coordinate system o-xyz and the x'-axis of a positioning device coordinate system o'-x'y'z' acquired by the inertial measuring device is calibrated with the average value $\alpha_m$, therefore, the cumulative error of the inertial measuring device is calibrated, and the error of calculating the next position may be reduced.

In some embodiments, any of the plurality of illumination sources is a relatively email structure compared to the ceiling. Therefore, any of the plurality of illumination sources is considered a particle. And any of the plurality of illumination sources refers to a center of an illumination part of any of the plurality of illumination sources.

Figure 4:
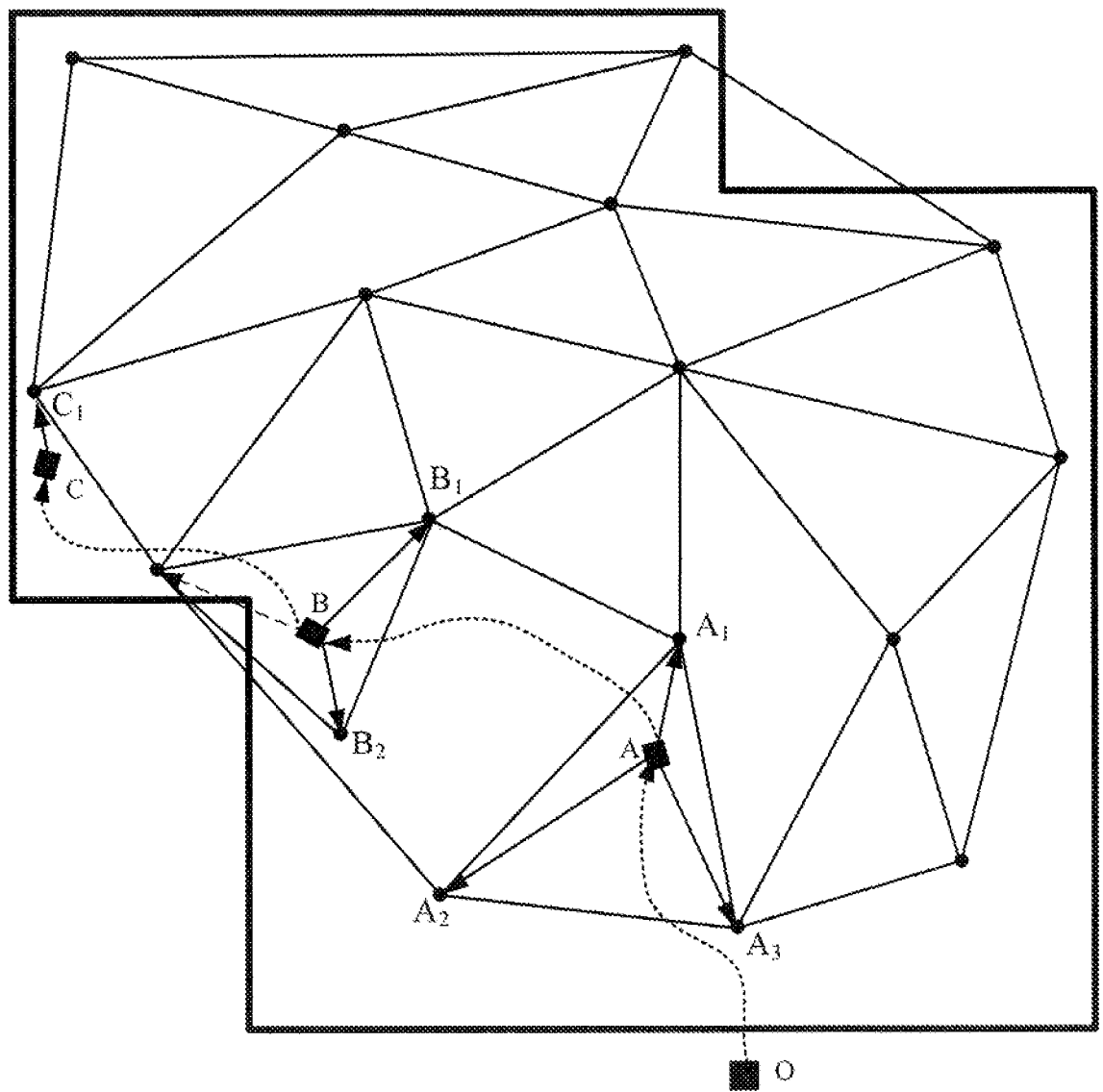
FIG. 4 is a schematic diagram illustrating a structure of a polygon grid in some embodiments according to the present disclosure.

FIG. 4 is a schematic diagram illustrating a structure of a polygon grid in some embodiments according to the present disclosure. Referring to FIG. 4, the positioning device starts from a starting point O and follow a route of a dotted line in FIG. 4. The time point when the positioning device is at the starting point O is assigned as $t_0$, a horizontal coordinate of the starting point O in the scene coordinate system o-xyz is assigned as a coordinate ($x_{101}(t_0), y_{101}(t_0)$) of the positioning device in the scene coordinate system o-xyz. Optionally, at time point $t_1$ ($t_1 > t_0$), a coordinate ($x_{101}(t_1), y_{101}(t_1)$) of the positioning device in the scene coordinate system o-xyz is calculated using the above equations based on the coordinate ($x_{101}(t_0), y_{101}(t_0)$) of the positioning device in the scene coordinate system o-xyz, and the included angle $\alpha$ between an x-axis of the scene coordinate system o-xyz and an x'-axis of a positioning device coordinate system o'-x'y'z'. Optionally, at time point $t_2$ ($t_2 > t_1$), a coordinate ($x_{101}(t_2), y_{101}(t_2)$) of the positioning device in the scene coordinate system o-xyz is calculated using the above equations based on the coordinate ($x_{101}(t_1), y_{101}(t_1)$) of the positioning device in the scene coordinate system o-xyz, and the included angle $\alpha$ between an x-axis of the scene coordinate system o-xyz and an x'-axis of a positioning device coordinate system o'-x'y'z'.

In some embodiments, at time point $t_2$, when the positioning device is at point A in FIG. 4, based on an estimated coordinate $(x_1(t_2), y_1(t_2))$ of the positioning device in a scene coordinate system o-xyz, when the projection of the positioning device on xoy plane of the scene coordinate system is in one Delaunay triangle of the polygon grid. And image objects of three reference illumination sources of the plurality of illumination source corresponding to three reference vertex points of the Delaunay triangle of the one or more reference vertex points can be detected in the scene image. Therefore, the three reference illumination sources (A1, A2, A3) of the plurality of illumination source are selected to perform positioning. According to the above methods, three position vectors $\vec{r}_{A1}, \vec{r}_{A2}, \vec{r}_{A3}$ in the positioning device coordinate system o'-x'y'z' respectively corresponding to the three reference illumination sources A1, A2, A3 of the plurality of illumination source are measured, therefore, the coordinate $(x_{101}(t_2), y_{101}(t_2))$ of the positioning device in the scene coordinate system o-xyz can be accurately calculated.

In some embodiments, at time point $t_2$, when the positioning device is at point B in FIG. 4, based on the estimated coordinate $(x_1(t_2), y_1(t_2))$ of the positioning device in a scene coordinate system o-xyz, when the projection of the positioning device on xoy plane of the scene coordinate system is in one Delaunay triangle of the polygon grid. However, image objects of two reference illumination sources of the plurality of illumination source corresponding to two reference vertex points of the Delaunay triangle of the one or more reference vertex points can be detected in the scene image. Therefore, the two reference illumination sources B1, B2 of the plurality of illumination source are selected to perform positioning. According to the above methods, two position vectors $\vec{r}_{B1}, \vec{r}_{B2}$ in the positioning device coordinate system o'-x'y'z' respectively corresponding to the two reference illumination sources B1, B2 of the plurality of illumination source are measured, therefore, the coordinate $(x_{101}(t_2), y_{101}(t_2))$ of the positioning device in the scene coordinate system o-xyz can be accurately calculated.

In some embodiments, at time point $t_2$, when the positioning device is at point C in FIG. 4, based on the estimated coordinate $(x_1(t_2), y_1(t_2))$ of the positioning device in a scene coordinate system o-xyz, when the projection of the positioning device on xoy plane of the scene coordinate system is not in any Delaunay triangle of the polygon grid. One image object of one of the plurality of illumination sources within a shortest distance from the projection of the positioning device on the xoy plane of the scene coordinate system is detected in the scene image. Therefore, the one of the plurality of illumination source C1 is selected to perform positioning. According to the above methods, one position vector $\vec{r}_{C1}$ in the positioning device coordinate system o'-x'y'z' respectively corresponding to the reference illumination source C1 of the plurality of illumination source is measured, therefore, the coordinate $(x_{101}(t_2), y_{101}(t_2))$ of the positioning device in the scene coordinate system o-xyz can be accurately calculated.

In some embodiments, at time point $t_2$, no image object of the plurality of vertex points is detected in the scene image, the estimated coordinate $(x_1(t_2), y_1(t_2))$ of the positioning device in a scene coordinate system o-xyz is assigned as the coordinate $(x_{101}(t_2), y_{1011}(t_2))$ of the positioning device in the scene coordinate system o-xyz.

In this disclosure, the positioning method includes determining an angle between one of the plurality of illumination sources and the positioning device, calculating the positioning coordinate of the positioning device in the scene coordinate system o-xyz based on positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle α. Therefore, it is not required that the plurality of illumination source should have communication function, and there is no need to remold the plurality of illumination source, which may reduce the cost and be widely used.

Figure 5:
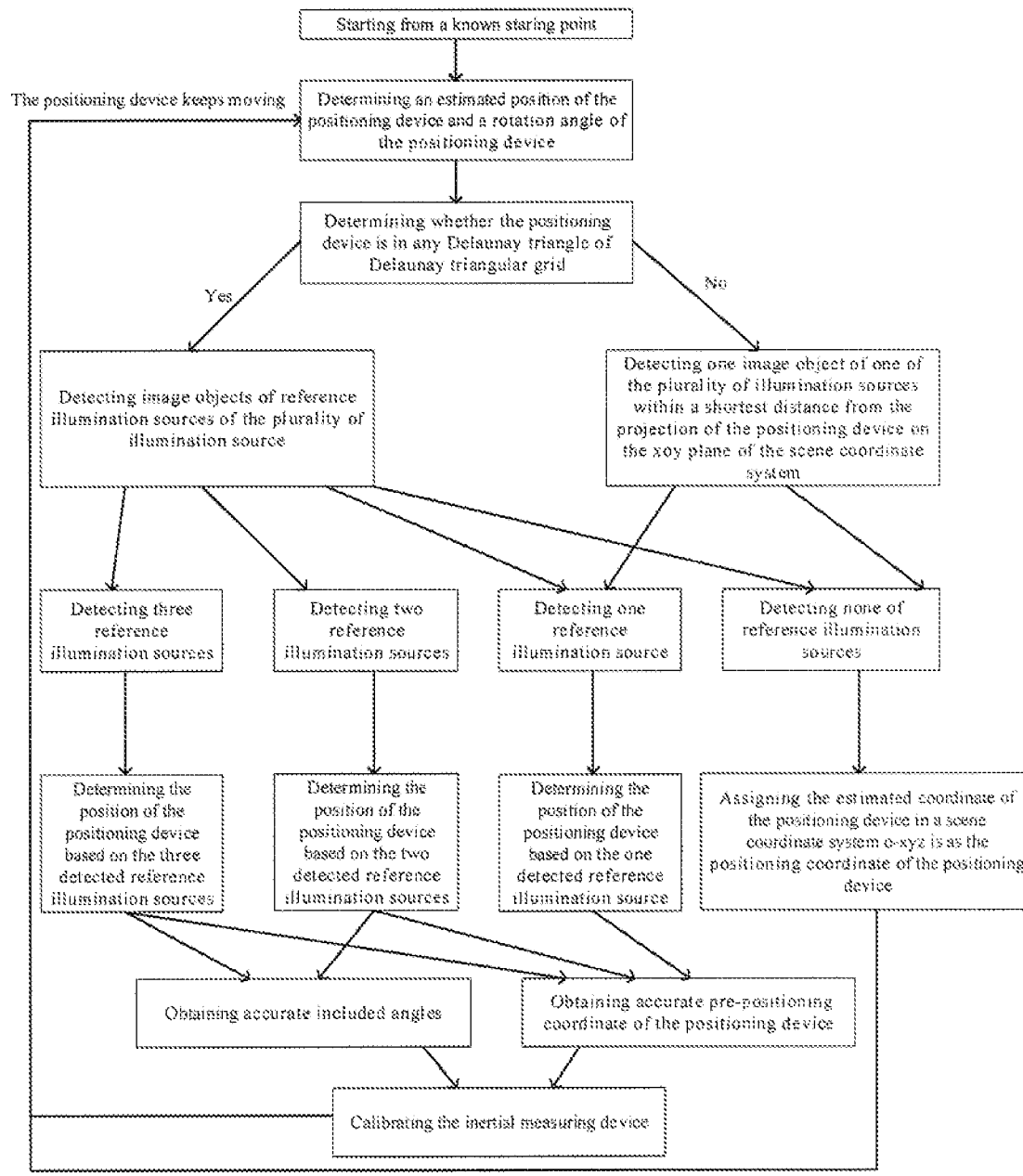
FIG. 5 is a flow chat illustrating a positioning method in some embodiments according to the present disclosure.

FIG. 5 is a flow chat illustrating a positioning method in some embodiments according to the present disclosure. Referring to FIG. 5, a positioning method includes a positioning device starting from a reference starting point, recording the reference starting point and an initial angle between an x-axis of the scene coordinate system o-xyz and an x'-axis of a positioning device coordinate system o'-x'y'z', and recording measurement results of an inertial measuring device thereby obtaining recorded measurement results of the inertial measuring device.

In some embodiments, the positioning method further includes determining an estimated position of the positioning device and a rotation angle of the positioning device using principle of the inertial navigation, based on the recorded measure results of the inertial measuring device and the principle of the inertial navigation. Optionally, the rotation angle of the positioning device is the angle rotated during a motion of the positioning device between a previous moment and a present moment.

In some embodiments, the positioning method further includes determining an estimated coordinate of the positioning device in a scene coordinate system o-xyz based on information about the scene coordinate system o-xyz (e.g. a known map of an indoor space) and a Delaunay triangular grid; and determining whether the estimated coordinate of the positioning device in the scene coordinate system o-xyz is in any Delaunay triangle of Delaunay triangular grid.

In some embodiments, when the estimated coordinate of the positioning device in the scene coordinate system o-xyz is in one Delaunay triangle of Delaunay triangular grid, image objects of three reference illumination sources of the plurality of illumination source corresponding to three reference vertex points of the Delaunay triangle of one or more reference vertex points can be detected in the scene image, based on the Delaunay triangular grid, fixed coordinate positions $(x_0, y_0, z_0)$ of the one or more reference illumination sources of the plurality of illumination sources in the scene coordinate system o-xyz and an included angle α between an x-axis of the scene coordinate system o-xyz and an x'-axis of a positioning device coordinate system o'-x'y'z'.

In some embodiments, when the estimated coordinate of the positioning device in the scene coordinate system o-xyz is in one Delaunay triangle of Delaunay triangular grid, image objects of two reference illumination sources of the plurality of illumination source corresponding to two reference vertex points of the Delaunay triangle of one or more reference vertex points can be detected in the scene image, based on the Delaunay triangular grid, fixed coordinate positions $(x_0, y_0, z_0)$ of the one or more reference illumination sources of the plurality of illumination sources in the scene coordinate system o-xyz and an included angle α between an x-axis of the scene coordinate system o-xyz and an x'-axis of a positioning device coordinate system o'-x'y'z'.

In some embodiments, when the estimated coordinate of the positioning device in the scene coordinate system o-xyz is not in any Delaunay triangle of Delaunay triangular grid, one image object of one of the plurality of illumination sources within a shortest distance from the projection of the positioning device on the xoy plane of the scene coordinate system is detected in the scene image.

In some embodiments, when the estimated coordinate of the positioning device in the scene coordinate system o-xyz is not in any Delaunay triangle of Delaunay triangular grid, no image object of the plurality of vertex points is detected in the scene image.

In some embodiments, subsequent to determining whether the estimated coordinate of the positioning device in the scene coordinate system o-xyz is in any Delaunay triangle of Delaunay triangular grid, any one of four results may be obtained. The four results are as follows: (1) three reference illumination sources of the plurality of illumination sources are detected in the scene image; (2) two reference illumination sources of the plurality of illumination source are detected in the scene image; (3) one reference illumination source of the plurality of illumination source is detected in the scene image; (4) none of reference illumination sources of the plurality of illumination source is detected in the scene image.

In some embodiments, when the estimated coordinate of the positioning device in the scene coordinate system o-xyz is in one Delaunay triangle of Delaunay triangular grid, but none of reference illumination sources of the plurality of illumination source can be detected in the scene image, the reason may be the reference illumination sources of the plurality of illumination source are shaded.

In some embodiments, subsequent to detecting the reference illumination source of the plurality source in the scene image, the position of the positioning device can be determined by the detected results. Optionally, the position of the positioning device can be determined based on the three detected reference illumination sources of the plurality of illumination sources. Optionally, the position of the positioning device can be determined based on the two detected reference illumination sources of the plurality of illumination sources. Optionally, the position of the positioning device can be determined based on the one detected reference illumination sources of the plurality of illumination sources. Optionally, when none of reference illumination sources of the plurality of illumination source is detected, the estimated coordinate $(x_1, y_1, z_1)$ of the positioning device in a scene coordinate system o-xyz is assigned as the positioning coordinate of the positioning device in the scene coordinate system o-xyz, and the rotation angle of the positioning device during the motion of the positioning device between a previous moment and a present moment is assigned as a relative rotation angle.

In some embodiments, subsequent to detecting more than one reference illumination sources of the plurality of illumination sources, an average value $\alpha_m$ of the multiple included angles $\alpha$ between the x-axis of the scene coordinate system o-xyz and the x'-axis of a positioning device coordinate system o'-x'y'z' is calculated. Optionally, in order to reduce the cumulative error of the inertial measuring device, the average value $\alpha_m$ of the multiple included angles $\alpha$ is assigned as an accurate included angle between the x-axis of the scene coordinate system o-xyz and the x'-axis of a positioning device coordinate system o'-x'y'z'.

In some embodiments, subsequent to detecting more than one reference illumination sources of the plurality of illumination sources, an average value $(x_{101p}, y_{101p}, z_{101p})_m$ of the multiple pre-positioning coordinates $(x_{101p}, y_{101p}, z_{101p})$ of the positioning device in the scene coordinate system o-xyz is calculated. Optionally, in order to calibrate the measurement of the inertial measuring device of the positioning equipment, an average value $(x_{101p}, y_{101p}, z_{101p})_m$ of the multiple pre-positioning coordinates $(x_{101p}, y_{101p}, z_{101p})$ of the positioning device in the scene coordinate system o-xyz is assigned as an accurate pre-positioning coordinate of the positioning device in the scene coordinate system o-xyz.

In some embodiments, when the process of determining the estimated position of the positioning device and the rotation angle of the positioning device is first performed, the initial information used in inertial navigation positioning is the reference starting point and the initial angle.

In some embodiments, when the process of determining the estimated position of the positioning device and the rotation angle of the positioning device is performed more than once, and more than one reference illumination sources of the plurality of illumination sources are detected, the initial information used in inertial navigation positioning is the accurate included angle between the x-axis of the scene coordinate system o-xyz and the x'-axis of a positioning device coordinate system o'-x'y'z' and the accurate pre-positioning coordinate of the positioning device in the scene coordinate system o-xyz. Optionally, only one reference illumination source of the plurality of illumination sources is detected, the rotation angle of the positioning device during the motion of the positioning device between the previous moment and the present moment is assigned as the accurate included angle. Optionally, none of reference illumination sources of the plurality of illumination source is detected, the estimated coordinate $(x_1, y_1, z_1)$ of the positioning device in a scene coordinate system o-xyz is assigned as the accurate pre-positioning coordinate of the positioning device in the scene coordinate system o-xyz, and the rotation angle of the positioning device during the motion of the positioning device between the previous moment and the present moment is assigned as the accurate included angle.

In some embodiments, in the process of detecting the reference illumination source of the plurality source in the scene image, a detecting scope is a detecting circle having the threshold radius as the image objects of reference illumination sources of the plurality of illumination sources corresponding to the one or more reference vertex points. Optionally, the value of the threshold radius is selected according to the accuracy of the inertial measuring device. The higher the accuracy of the inertial measuring device is, the smaller the detecting circle is.

In some embodiments, the process of calibration includes replacing the estimated coordinate of the positioning device in a scene coordinate system o-xyz with accurate pre-positioning coordinate of the positioning device in the scene coordinate system o-xyz, and replacing the rotation angle of the positioning device during the motion of the positioning device between the starting moment and the present moment with the accurate included angle.

Figure 6:
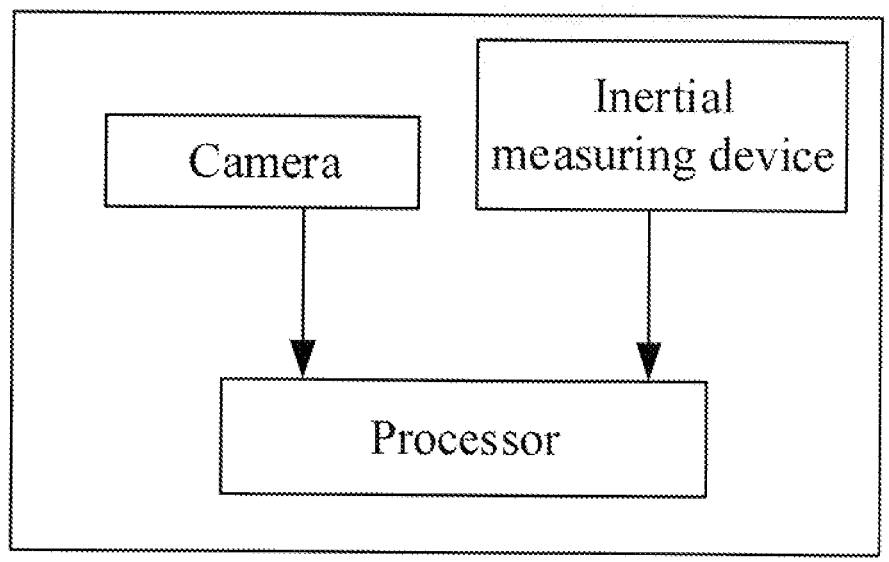
FIG. 6 is a schematic diagram illustrating a structure of a positioning apparatus in some embodiments according to the present disclosure.

In another aspect, the present disclosure provides a positioning apparatus. FIG. 6 is a schematic diagram illustrating a structure of a positioning apparatus in some embodiments according to the present disclosure. Referring to FIG. 6, a positioning apparatus including a camera configured to obtain a scene image having image objects of a plurality of illumination sources, optionally, the scene image acquired by a positioning device. The positioning apparatus further includes an inertial measuring device configured to obtain motion data of the positioning device, a memory, and one or more processors. Optionally, the memory and the one or more processors are connected with each other. Optionally, the memory stores computer-executable instructions for controlling the one or more processors to determine an estimated coordinate of the positioning device in a scene coordinate system o-xyz based on the motion data of the positioning device. Optionally, the memory stores computer-executable instructions for controlling the one or more processors to determine an included angle α between an x-axis of the scene coordinate system o-xyz and an x'-axis of a positioning device coordinate system o'-x'y'z' based on the motion data of the positioning device. Optionally, the memory stores computer-executable instructions for controlling the one or more processors to determine one or more reference vertex points based on the estimated coordinate $(x_1, y_1, z_1)$ of the positioning device. Optionally, the memory stores computer-executable instructions for controlling the one or more processors to detect in the scene image objects of one or more reference illumination sources of the plurality of illumination sources corresponding to the reference vertex points. Optionally, the memory stores computer-executable instructions for controlling the one or more processors to determine a positioning coordinate $(x_{101},y_{101},z_{101})$ of the positioning device in the scene coordinate system o-xyz based on one or a combination of (1) and (2) as follows: (1) the estimated coordinate $(x_1, y_1, z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle α.

Optionally, the memory stores computer-executable instructions for controlling the one or more processors to obtain a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz. Optionally, the memory stores computer-executable instructions for controlling the one or more processors to select N vertex points of the polygon grid as the one or more reference vertex points based on the estimated coordinate $(x_1,y_1,z_1)$ of the positioning device, optionally, wherein N≥1.

In some embodiments, the inertial measuring device includes one device selected from a group consisting of a triaxial angular velocity sensor and a three-axis magnetic field sensor; and an acceleration sensor. Optionally, the motion data of the positioning device includes a most recent data of a most recent positioning coordinate $(x_{101},y_{101},z_{101})'$ of the positioning device in the scene coordinate system o-xyz; a most recent data of a most recent included angle α' between the x-axis of the scene coordinate system o-xyz and a first x'-axis of the pre-positioning device coordinate system o'-x'y'z'; a present data of a present speed of the positioning device in the scene coordinate system o-xyz; a present data of a present acceleration of the positioning device in the scene coordinate system o-xyz; a rotation angle of the positioning device during the motion between a present moment and a previous moment when the most recent data of the most recent positioning coordinate $(x_{101}, y_{101},z_{101})'$ of the positioning device and the most recent data of the most recent included angle α' are determined; and a time duration between the present moment and the previous moment.

In some embodiments, in condition that there are multiple pre-positioning coordinates $(x_{101p},y_{101p},z_{101p})$ of the positioning device in the scene coordinate system o-xyz, an average value $(x_{101p},y_{101p},z_{101p})_m$ of the multiple pre-positioning coordinates $(x_{101p},y_{101p},z_{101p})$ of the positioning device in the scene coordinate system o-xyz is assigned as the positioning coordinate $(x_{101},y_{101},z_{101})$ of the positioning device in the scene coordinate system o-xyz, the memory further stores computer-executable instructions for controlling the one or more processors to calibrate the motion data of the positioning device obtained by the inertial measuring device. Optionally, the memory further stores computer-executable instructions for controlling the one or more processors to assign the average value $(x_{101p},y_{101p},z_{101p})_m$ of the multiple pre-positioning coordinates $(x_{101p},y_{101p},z_{101p})$ of the positioning device in the scene coordinate system o-xyz as the positioning coordinate $(x_{101},y_{101},z_{101})$ of the positioning device in the scene coordinate system o-xyz.

In some embodiments, the memory further stores computer-executable instructions for controlling the one or more processors to assign a plurality of projections of the plurality of illumination sources on a xoy plane of the scene coordinate system o-xyz as vertex points. Optionally, the memory further stores computer-executable instructions for controlling the one or more processors to obtain a polygon grid by performing a polygonal division on a xoy plane of the scene coordinate system o-xyz based on a plurality of vertex points, the plurality of vertex points being projections of the plurality of illumination sources on the xoy plane of the scene coordinate system o-xyz. Optionally, the memory further stores computer-executable instructions for controlling the one or more processors to select N vertex points of the polygon grid as the one or more reference vertex points based on the estimated coordinate $(x_1, y_1, z_1)$ of the positioning device. Optionally, N≥1.

In some embodiments, the positioning device includes a receiver configured to receive information about the polygon grid.

In some embodiments, the positioning device includes a power supply providing power.

Various appropriate materials may be used for making the memory. Examples of materials suitable for making the memory include, but not limited to, ROM, RAM, disks or optical disk.

In some embodiments, the positioning apparatus includes a camera, an inertial measuring device, a memory, and one or more processors. Optionally, the memory stores computer-executable instructions for controlling the one or more processors to obtain a scene image having image objects of a plurality of illumination sources, the scene image acquired by a positioning device; obtain motion data of the positioning device during a motion; determine an estimated coordinate $(x_1,y_1, z_1)$ of the positioning device in a scene coordinate system o-xyz based on the motion data of the positioning device; determine an included angle α between an x-axis of the scene coordinate system o-xyz and an x'-axis of a positioning device coordinate system o'-x'y'z' based on the motion data of the positioning device; determine one or more reference vertex points based on the estimated coordinate $(x_1,y_1, z_1)$ of the positioning device; detect in the scene image objects of one or more reference illumination sources of the plurality of illumination sources corresponding to the one or more reference vertex points; and determine a positioning coordinate $(x_{101},y_{101},z_{101})$ of the positioning device in the scene coordinate system o-xyz based on one or a combination of (1) and (2) as follows: (1) the estimated coordinate $(x_1, y_1, z_1)$ of the positioning device in the scene coordinate system o-xyz; and (2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle $\alpha$.

In some embodiments, the motion data includes a most recent data of a most recent positioning coordinate $(x_{101}, y_{101}, z_{101})'$ of the positioning device in the scene coordinate system o-xyz; a most recent data of a most recent included angle $\alpha'$ between the x-axis of the scene coordinate system o-xyz and a x'-axis of the pre-positioning device coordinate system o'-x'y'z'; a present data of a present speed of the positioning device in the scene coordinate system o-xyz; a present data of a present acceleration of the positioning device in the scene coordinate system o-xyz; a rotation angle of the positioning device during the motion between a present moment and a previous moment, the previous moment being a moment the most recent data of the most recent positioning coordinate $(x_{101}, y_{101}, z_{101})'$ of the positioning device and the most recent data of the most recent included angle $\alpha'$ is determined; and a time duration between the present moment and the previous moment.

In some embodiments, in the process of determining the estimated coordinate $(x_1, y_1, z_1)$ of the positioning device in the scene coordinate system o-xyz, the memory stores computer-executable instructions for controlling the one or more processors to perform an inertial navigation positioning using the most recent positioning coordinate $(x_{101}, y_{101}, z_{101})'$ of the positioning device in the scene coordinate system o-xyz at the previous moment as a reference starting point, and based on a combination of: the present data of the present speed of the positioning device in the scene coordinate system o-xyz; the present data of the present acceleration of the positioning device in the scene coordinate system o-xyz; the rotation angle of the positioning device during the motion between the present moment and the previous moment; and the time duration between the present moment and the previous moment.

In some embodiments, the memory stores computer-executable instructions for controlling the one or more processors to determine a relative rotation angle of a present position coordinate of the positioning device in the scene coordinate system o-xyz at the present moment with respect to a most recent position coordinate of the positioning device in the scene coordinate system o-xyz at the previous moment, based on the rotation angle of the positioning device during the motion between the present moment and the previous moment; and assign a sum of the most recent included angle $\alpha\alpha$ and the relative rotation angle as the included angle $\alpha$ between the x-axis of the scene coordinate system o-xyz and the x'-axis of the positioning device coordinate system o'-x'y'z'; thereby determining the included angle $\alpha$ between the x-axis of the scene coordinate system o-xyz and the x'-axis of the positioning device coordinate system o'-x'y'z' based on the motion data of the positioning device.

In some embodiments, the memory stores computer-executable instructions for controlling the one or more processors to obtain a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and select N vertex points of the polygon grid as the one or more reference vertex points based on the estimated coordinate $(x_1, y_1, z_1)$ of the positioning device; thereby determining the one or more reference vertex points based on the estimated coordinate $(x_1, y_1, z_1)$ of the positioning device. Optionally, $N \geq 1$. Optionally, the memory stores computer-executable instructions for controlling the one or more processors to assign the projections of the plurality of illumination sources on the xoy plane of the scene coordinate system o-xyz as the plurality of vertex points; and perform the polygonal division on the xoy plane of the scene coordinate system o-xyz based on the plurality of vertex points.

In some embodiments, the memory stores computer-executable instructions for controlling the one or more processors to determine whether the projection of the positioning device on the xoy plane of the scene coordinate system is in any polygon of the polygon grid based on the estimated coordinate $(x_1, y_1, z_1)$; assign a polygon containing the projection of the positioning device on the xoy plane of the scene coordinate system as a selected polygon based on a determination that the projection of the positioning device on the xoy plane of the scene coordinate system is in one polygon of the polygon grid, and assigning vertex points of the selected polygon as the N vertex points; and assign one of the plurality of vertex points within a shortest distance from the projection of the positioning device on the xoy plane of the scene coordinate system as the N vertex point based on a determination that the projection of the positioning device on the xoy plane of the scene coordinate system is not in any polygon of the polygon grid; thereby selecting N vertex points of the polygon grid as the one or more reference vertex points based on the estimated coordinate $(x_1, y_1, z_1)$ of the positioning device.

In some embodiments, the polygonal division is a triangulation. Optionally, the polygonal division adopts Delaunay triangulation algorithm.

In some embodiments, the memory stores computer-executable instructions for controlling the one or more processors to detect in the scene image the image objects of reference illumination sources of the plurality of illumination sources corresponding to the one or more reference vertex points based on a reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'.

In some embodiments, the memory stores computer-executable instructions for controlling the one or more processors to determine an estimated position of the reference illumination sources of the plurality of illumination sources corresponding to the one or more reference vertex points in the scene image, based on the reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'; set the estimated position of the reference illumination sources of the plurality of illumination sources in the scene image as a center of a detecting circle having a threshold radius; and select image objects of one or more illumination sources of the plurality of illumination sources within the detecting circle having the threshold radius as the image objects of reference illumination sources of the plurality of illumination sources corresponding to the one or more reference vertex points; thereby detecting in the scene image the image objects of reference illumination sources of the plurality of illumination sources corresponding to the one or more reference vertex points.

In some embodiments, the memory stores computer-executable instructions for controlling the one or more processors to determine the positioning coordinate ($x_{101}$, $y_{101}$, $z_{101}$) of the positioning device in the scene coordinate system o-xyz based on the positions of the image objects of the one or more reference illumination sources of the plurality of illumination sources in the scene image, the fixed coordinate positions ($x_0$, $y_0$, $z_0$) of the one or more reference illumination sources of the plurality of illumination sources in the scene coordinate system o-xyz, and the included angle $\alpha$. Optionally, the memory stores computer-executable instructions for controlling the one or more processors to determine a pre-positioning coordinate ($x_{101p}$, $y_{101p}$, $z_{101p}$) of the positioning device in the scene coordinate system o-xyz based on each individual one of the positions of the image objects of the one or more reference illumination sources of the plurality of illumination sources in the scene image, each individual one of the fixed coordinate positions ($x_0$, $y_0$, $z_0$) of the one or more reference illumination sources of the plurality of illumination sources in the scene coordinate system o-xyz, and the included angle $\alpha$; determine a coordinate ($r_x$, $r_y$, $r_z$) of a position vector $\vec{r}$ in the positioning device coordinate system o'-x'y'z' for each individual one of the one or more reference illumination sources of the plurality of illumination sources in the scene image. Optionally, the pre-positioning coordinate ($x_{101p}$, $y_{101p}$, $z_{101p}$) of the positioning device in the scene coordinate system o-xyz is determined using the following equation:

$$(x_{101_p}, y_{101_p}) = (x_0, y_0) - (r_x, r_y) \bullet \begin{bmatrix} \cos\alpha & \sin\alpha \\ -\sin\alpha & \cos\alpha \end{bmatrix};$$

wherein $z_{101_p}$ is a normal distance between point o' in the positioning device coordinate system o'-x'y'z' and the xoy plane of the scene coordinate system o-xyz.

In some embodiments, the memory stores computer-executable instructions for controlling the one or more processors to determine an included angle $\varphi$ between the position vector $\vec{r}$ and an z'-axis of the positioning device coordinate system o'-x'y'z' based on the positions of the image objects of the one or more reference illumination sources of the plurality of illumination sources in the scene image; and determine an included angle $\theta$ between a projection vector $\vec{r_H}$ and the x'-axis of the positioning device coordinate system o'-x'y'z' based on the positions of the image objects of the one or more reference illumination sources of the plurality of illumination sources in the scene image, the projection vector $\vec{r_H}$ being an orthographic projection of the position vector $\vec{r}$ on the x'o'y' plane; and determine the coordinate ($r_x$, $r_y$, $r_z$) of a position vector $\vec{r}$ in the positioning device coordinate system o'-x'y'z' based on equation: ($r_x$,$r_y$,$r_z$)=(tan $\varphi$ cos $\theta$, tan $\varphi$ sin $\theta$,1)·|$z_0$–h|; thereby determining the coordinate ($r_x$, $r_y$, $r_z$) of the position vector $\vec{r}$ in the positioning device coordinate system o'-x'y'z' for each individual one of the one or more reference illumination sources of the plurality of illumination sources in the scene image.

In some embodiments, in condition that there are multiple pre-positioning coordinates ($x_{101p}$,$y_{101p}$,$z_{101p}$) of the positioning device in the scene coordinate system o-xyz, the memory stores computer-executable instructions for controlling the one or more processors to assign an average value ($x_{101p}$,$y_{101p}$,$z_{101p}$)$_m$ of the multiple pre-positioning coordinates ($x_{101p}$,$y_{101p}$,$z_{101p}$) of the positioning device in the scene coordinate system o-xyz as the positioning coordinate ($x_{101}$,$y_{101}$,$z_{101}$) of the positioning device in the scene coordinate system o-xyz. In some embodiments, in condition that there only one pre-positioning coordinate ($x_{101p}$, $y_{101p}$,$z_{101p}$) of the positioning device in the scene coordinate system o-xyz, the memory stores computer-executable instructions for controlling the one or more processors to assign the only one pre-positioning coordinate ($x_{101p}$,$y_{101p}$, $z_{101p}$) of the positioning device in the scene coordinate system o-xyz as the positioning coordinate ($x_{101}$, $y_{101}$,$z_{101}$) of the positioning device in the scene coordinate system o-xyz.

In some embodiments, in condition that there are multiple pre-positioning coordinates ($x_{101p}$,$y_{101p}$,$z_{101p}$) of the positioning device in the scene coordinate system o-xyz, the memory stores computer-executable instructions for controlling the one or more processors to calculate multiple included angles $\alpha$ respectively between the x-axis of the scene coordinate system o-xyz and the x'-axis of a positioning device coordinate system o'-x'y'z' based on the average value ($x_{101p}$,$y_{101p}$,$z_{101p}$)$_m$ of the multiple pre-positioning coordinates ($x_{101p}$,$y_{101p}$,$z_{101p}$) of the positioning device in the scene coordinate system o-xyz, the coordinate ($r_x$, $r_y$, $r_K$) of the position vector $\vec{r}$ for each individual one of the one or more reference illumination sources of the plurality of illumination sources in the positioning device coordinate system o'-x'y'z', and the fixed coordinate positions ($x_0$, $y_0$, $z_0$) of the one or more reference illumination sources of the plurality of illumination sources in the scene coordinate system o-xyz; calculate an average value $\alpha_m$ of the multiple included angles $\alpha$ between the x-axis of the scene coordinate system o-xyz and the x'-axis of a positioning device coordinate system o'-x'y'z'; and assign the average value $\alpha_m$ of the multiple included angles $\alpha$ as an accurate included angle between the x-axis of the scene coordinate system o-xyz and the x'-axis of a positioning device coordinate system o'-x'y'z'.

In some embodiments, the camera of the apparatus for positioning has an optical axis substantially parallel to a z-axis of the scene coordinate system o-xyz. Optionally, the camera of the apparatus for positioning captures the scene image. Optionally, the optical axis of the camera of is substantially perpendicular to the ground. Optionally, a point o' of the positioning device coordinate system o'-x'y'z' is on the camera. Optionally, a z'-axis of the positioning device coordinate system o'-x'y'z' substantially overlaps with the optical axis of the camera.

In some embodiments, the memory stores computer-executable instructions for controlling the one or more processors to receive data of the fixed coordinate positions ($x_0$, $y_0$, $z_0$) of the one or more reference illumination sources of the plurality of illumination sources in the scene coordinate system o-xyz. Optionally, the memory stores computer-executable instructions for controlling the one or more processors to measure a normal distance h between an origin point o' of the positioning device coordinate system o'-x'y'z' and ground.

In some embodiments, the memory stores computer-executable instructions for controlling the one or more processors to assign the estimated coordinate ($x_1$, $y_1$, $z_1$) of the positioning device in a scene coordinate system o-xyz as the positioning coordinate ($x_{101}$,$y_{101}$, $z_{101}$) of the positioning device in the scene coordinate system o-xyz in condition that no illumination source is detected; and determine the positioning coordinate ($x_{101}$,$y_{101}$,$z_{101}$) of the positioning device in the scene coordinate system o-xyz based on the positions of the image objects of the one or more reference illumination sources of the plurality of illumination sources in the scene image, the fixed coordinate positions ($x_0, y_0, z_0$) of the plurality of illumination sources in the scene coordinate system o-xyz, and the included angle $\alpha$.

In another aspect, the present disclosure provides a computer-program product having a non-transitory tangible computer-readable medium having computer-readable instructions thereon. In some embodiments, the computer-readable instructions are executable by a processor to cause the processor to perform obtaining a scene image comprising image objects of a plurality of illumination sources, the scene image acquired by a positioning device; obtaining motion data of the positioning device during a motion; determining an estimated coordinate ($x_1, y_1, z_1$) of the positioning device in a scene coordinate system o-xyz based on the motion data of the positioning device; determining an included angle $\alpha$ between an x-axis of the scene coordinate system o-xyz and an x'-axis of a positioning device coordinate system o'-x'y'z' based on the motion data of the positioning device; determining one or more reference vertex points based on the estimated coordinate ($x_1, y_1, z_1$) of the positioning device; detecting in the scene image objects of one or more reference illumination sources of the plurality of illumination sources corresponding to the one or more reference vertex points; and determining a positioning coordinate ($x_{101}, y_{101}, z_{101}$) of the positioning device in the scene coordinate system o-xyz based on one or a combination of (1) and (2) as follows: (1) the estimated coordinate ($x_1, y_1, z_1$) of the positioning device in the scene coordinate system o-xyz; and (2) positions of the image objects of the one or more reference illumination sources of the plurality of illumination sources in the scene image, fixed coordinate positions ($x_0, y_0, z_0$) of the one or more reference illumination sources of the plurality of illumination sources in the scene coordinate system o-xyz, and the included angle $\alpha$.

Optionally, the motion data of the positioning device includes a most recent data of a most recent positioning coordinate $(x_{101}, y_{101}, z_{101})'$ of the positioning device in the scene coordinate system o-xyz; a most recent data of a most recent included angle $\alpha'$ between the x-axis of the scene coordinate system o-xyz and a x'-axis of the positioning device coordinate system o'-x'y'z'; a present data of a present speed of the positioning device in the scene coordinate system o-xyz; a present data of a present acceleration of the positioning device in the scene coordinate system o-xyz; a rotation angle of the positioning device during the motion between a present moment and a previous moment, the previous moment being a moment the most recent data of the most recent positioning coordinate $(x_{101}, y_{101}, z_{101})'$ of the positioning device is determined; and a time duration between the present moment and the previous moment.

In some embodiments, the computer-readable instructions are executable by a processor to further cause the processor to perform an inertial navigation positioning using the most recent positioning coordinate $(x_{101}, y_{101}, z_{101})'$ of the positioning device in the scene coordinate system o-xyz at the previous moment as a reference starting point, and based on a combination of the present data of the present speed of the positioning device in the scene coordinate system o-xyz; the present data of the present acceleration of the positioning device in the scene coordinate system o-xyz; and the rotation angle of the positioning device during the motion between the present moment and the previous moment; and the time duration between the present moment and the previous moment; thereby determining the estimated coordinate ($x_1, y_1, z_1$) of the positioning device in the scene coordinate system o-xyz.

In some embodiments, the computer-readable instructions are executable by a processor to further cause the processor to perform determining a relative rotation angle $\delta$ of a present position coordinate of the positioning device in the scene coordinate system o-xyz at the present moment with respect to a most recent position coordinate of the positioning device in the scene coordinate system o-xyz at the previous moment, based on the rotation angle of the positioning device during the motion between the present moment and the previous moment; and assigning a sum of the most recent included angle $\alpha'$ and the relative rotation angle $\delta$ as the included angle $\alpha$ between the x-axis of the scene coordinate system o-xyz and the x'-axis of the positioning device coordinate system o'-x'y'z'; thereby determining the included angle $\alpha$ between the x-axis of the scene coordinate system o-xyz and the x'-axis of the positioning device coordinate system o'-x'y'z' based on the motion data of the positioning device.

In some embodiments, the computer-readable instructions are executable by a processor to further cause the processor to perform obtaining a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and selecting N vertex points of the polygon grid as the one or more reference vertex points based on the estimated coordinate ($x_1, y_1, z_1$) of the positioning device; thereby determining the one or more reference vertex points based on the estimated coordinate ($x_1, y_1, z_1$) of the positioning device. Optionally, $N \geq 1$.

In some embodiments, the computer-readable instructions are executable by a processor to further cause the processor to perform assigning the projections of the plurality of illumination sources on the xoy plane of the scene coordinate system o-xyz as the plurality of vertex points; and performing the polygonal division on the xoy plane of the scene coordinate system o-xyz based on the plurality of vertex points.

In some embodiments, the computer-readable instructions are executable by a processor to further cause the processor to perform determining whether the projection of the positioning device on the xoy plane of the scene coordinate system is in any polygon of the polygon grid based on the estimated coordinate ($x_1, y_1, z_1$); assigning a polygon containing the projection of the positioning device on the xoy plane of the scene coordinate system as a selected polygon based on a determination that the projection of the positioning device on the xoy plane of the scene coordinate system is in one polygon of the polygon grid, and assigning vertex points of the selected polygon as the N vertex points; and assigning one of the plurality of vertex points within a shortest distance from the projection of the positioning device on the xoy plane of the scene coordinate system as the N vertex point based on a determination that the projection of the positioning device on the xoy plane of the scene coordinate system is not in any polygon of the polygon grid; thereby selecting N vertex points of the polygon grid as the one or more reference vertex points based on the estimated coordinate ($x_1, y_1, z_1$) of the positioning device.

Optionally, the polygonal division is a triangulation. Optionally, the polygonal division adopts Delaunay triangulation algorithm.

In some embodiments, detecting in the scene image the image objects of reference illumination sources of the plurality of illumination sources corresponding to the one or more reference vertex points is performed based on a reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'.

In some embodiments, the computer-readable instructions are executable by a processor to further cause the processor to perform determining an estimated position of the reference illumination sources of the plurality of illumination sources corresponding to the one or more reference vertex points in the scene image, based on the reference coordinate $(x_0, y_0, 0)$ of one of the reference vertex points and the included angle $\alpha$ between the x-axis of the scene coordinate system o-xyz and the x'-axis of a positioning device coordinate system o'-x'y'z'; setting the estimated position of the reference illumination sources of the plurality of illumination sources in the scene image as a center of a detecting circle having a threshold radius; and selecting image objects of one or more illumination sources of the plurality of illumination sources within the detecting circle having the threshold radius as the image objects of reference illumination sources of the plurality of illumination sources corresponding to the one or more reference vertex points; thereby detecting in the scene image the image objects of reference illumination sources of the plurality of illumination sources corresponding to the one or more reference vertex points.

In some embodiments, determining the positioning coordinate $(x_{101}, y_{101}, z_{101})$ of the positioning device in the scene coordinate system o-xyz is based on the positions of the image objects of the one or more reference illumination sources of the plurality of illumination sources in the scene image, the fixed coordinate positions $(x_0, y_0, z_0)$ of the one or more reference illumination sources of the plurality of illumination sources in the scene coordinate system o-xyz, and the included angle $\alpha$. Optionally, the computer-readable instructions are executable by a processor to further cause the processor to perform determining a pre-positioning coordinate $(x_{101p}, y_{101p}, z_{101p})$ of the positioning device in the scene coordinate system o-xyz based on each individual one of the positions of the image objects of the one or more reference illumination sources of the plurality of illumination sources in the scene image, each individual one of the fixed coordinate positions $(x_0, y_0, z_0)$ of the one or more reference illumination sources of the plurality of illumination sources in the scene coordinate system o-xyz, and the included angle $\alpha$; determining a coordinate $(r_x, r_y, r_z)$ of a position vector $\vec{r}$ in the positioning device coordinate system o'-x'y'z' for each individual one of the one or more reference illumination sources of the plurality of illumination sources in the scene image. Optionally, the pre-positioning coordinate $(x_{101p}, y_{101p}, z_{101p})$ of the positioning device in the scene coordinate system o-xyz is determined using the following equation $$(x_{101_p}, y_{101_p}) = (x_0, y_0) - (r_x, r_y) \bullet \begin{bmatrix} \cos\alpha & \sin\alpha \\ -\sin\alpha & \cos\alpha \end{bmatrix};$$

$z_{101_p}$ is a normal distance h between point o' in the positioning device coordinate system o'-x'y'z' and the xoy plane of the scene coordinate system o-xyz.

In some embodiments, the computer-readable instructions are executable by a processor to further cause the processor to perform determining an included angle $\varphi$ between the position vector $\vec{r}$ and an z'-axis of the positioning device coordinate system o'-x'y'z' based on the positions of the image objects of the one or more reference illumination sources of the plurality of illumination sources in the scene image; determining an included angle $\theta$ between a projection vector $\vec{r}_H$ and the x'-axis of the positioning device coordinate system o'-x'y'z' based on the positions of the image objects of the one or more reference illumination sources of the plurality of illumination sources in the scene image, the projection vector $\vec{r}_H$ being an orthographic projection of the position vector $\vec{r}$ on the x'o'y' plane; and determining the coordinate $(r_x, r_y, r_z)$ of a position vector $\vec{r}$ in the positioning device coordinate system o'-x'y'z' based on equation $(r_x, r_y, r_z) = (\tan\varphi \cos\theta, \tan\varphi \sin\theta, 1) \cdot |z_0 - h|$; thereby determining the coordinate $(r_x, r_7, r)$ of the position vector $\vec{r}$ in the positioning device coordinate system o'-x'y'z' for each individual one of the one or more reference illumination sources of the plurality of illumination sources in the scene image.

In some embodiments, in condition that there are multiple pre-positioning coordinates $(x_{101_p}, y_{101_p}, z_{101_p})$ positioning coordinate $(x_{101_p}, y_{101_p}, z_{101_p})$ of the positioning device in the scene coordinate system o-xyz, the computer-readable instructions are executable by a processor to further cause the processor to assign an average value $(x_{101_p}, y_{101_p}, z_{101_p})_m$ of the multiple pre-positioning coordinates $(x_{101_p}, y_{101_p}, z_{101_p})$ of the positioning device in the scene coordinate system o-xyz as the positioning coordinate $(x_{101}, y_{101}, z_{101})$ of the positioning device in the scene coordinate system o-xyz. In some embodiments, in condition that there only one pre-positioning coordinate $(x_{101_p}, y_{101_p}, z_{101_p})$ of the positioning device in the scene coordinate system o-xyz, the computer-readable instructions are executable by a processor to further cause the processor to assign the only one pre-positioning coordinate $(x_{101_p}, y_{101_p}, z_{101_p})$ of the positioning device in the scene coordinate system o-xyz as the positioning coordinate $(x_{101}, y_{101}, z_{101})$ of the positioning device in the scene coordinate system o-xyz.

In some embodiments, in condition that there are multiple pre-positioning coordinates $(x_{101_p}, y_{101_p}, z_{101_p})$ of the positioning device in the scene coordinate system o-xyz, the computer-readable instructions are executable by a processor to further cause the processor to perform calculating multiple included angles $\alpha$ respectively between the x-axis of the scene coordinate system o-xyz and the x'-axis of a positioning device coordinate system o'-x'y'z' based on the average value $(x_{101_p}, y_{101_p}, z_{101_p})_m$ of the multiple pre-positioning coordinates $(x_{101_p}, y_{101_p}, z_{101_p})$ of the positioning device in the scene coordinate system o-xyz, the coordinate $(r_x, r_y, r_z)$ of the position vector $\vec{r}$ for each individual one of the one or more reference illumination sources of the plurality of illumination sources in the positioning device coordinate system o'-x'y'z', and the fixed coordinate positions $(x_0, y_0, z_0)$ of the one or more reference illumination sources of the plurality of illumination sources in the scene coordinate system o-xyz; calculating an average value $\alpha_m$ of the multiple included angles $\alpha$ between the x-axis of the scene coordinate system o-xyz and the x'-axis of a positioning device coordinate system o'-x'y'z'; and assigning the average value $\alpha_m$ of the multiple included angles $\alpha$ as an accurate included angle between the x-axis of the scene coordinate system o-xyz and the x'-axis of a positioning device coordinate system o'-x'y'z'.

In some embodiments, an origin point o of the scene coordinate system o-xyz is on ground; a z-axis of the scene coordinate system o-xyz is substantially parallel to an optical axis of a camera in the positioning device; the scene image is captured by the camera of the positioning device; the optical axis of the camera of the positioning device is substantially perpendicular to the ground; an origin point o' of the positioning device coordinate system o'-x'y'z' is on the camera of the positioning device; and a z'-axis of the positioning device coordinate system o'-x'y'z' substantially overlaps with the optical axis of the camera of the positioning device.

In some embodiments, the computer-readable instructions am executable by a processor to further cause the processor to perform In some embodiments, the computer-readable instructions are executable by a processor to further cause the processor to perform receiving data of the fixed coordinate positions $(x_0, y_0, z_0)$ of the one or more reference illumination sources of the plurality of illumination sources in the scene coordinate system o-xyz.

In some embodiments, the computer-readable instructions are executable by a processor to further cause the processor to perform measuring a normal distance h between the origin point o' of the positioning device coordinate system o'-x'y'z' and ground.

In some embodiments, the computer-readable instructions are executable by a processor to further cause the processor to perform assigning the estimated coordinate $(x_1, y_1, z_1)$ of the positioning device in a scene coordinate system o-xyz as the positioning coordinate $(x_{101}, y_{101}, z_{101})$ of the positioning device in the scene coordinate system o-xyz in condition that no illumination source is detected; and determining the positioning coordinate $(x_{101}, y_{101}, z_{101})$ of the positioning device in the scene coordinate system o-xyz based on the positions of the image objects of the one or more reference illumination sources of the plurality of illumination sources in the scene image, the fixed coordinate positions $(x_0, y_0, z_0)$ of the plurality of illumination sources in the scene coordinate system o-xyz, and the included angle $\alpha$.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A positioning method, comprising:
receiving, by a processor, a scene image comprising image objects of a plurality of illumination sources, the scene image acquired by a positioning device;
receiving, by the processor, motion data of the positioning device during a motion, the motion data acquired by an inertial measuring device and stored in a memory;
determining, by the processor, an estimated coordinate $(x_1, y_1, z_1)$ of the positioning device in a scene coordinate system o-xyz based on the motion data of the positioning device;
determining, by the processor, an included angle $\alpha$ between an x-axis of the scene coordinate system o-xyz and an x'-axis of a positioning device coordinate system o'-x'y'z' based on the motion data of the positioning device;
determining, by the processor, one or more reference vertex points based on the estimated coordinate $(x_1, y_1, z_1)$ of the positioning device;
detecting, by the processor, in the scene image objects of one or more reference illumination sources of the plurality of illumination sources corresponding to the one or more reference vertex points; and
determining, by the processor, a positioning coordinate $(x_{101}, y_{101}, z_{101})$ of the positioning device in the scene coordinate system o-xyz based on one or a combination of:
(1) the estimated coordinate $(x_1, y_1, z_1)$ of the positioning device in the scene coordinate system o-xyz; and
(2) positions of the image objects of the one or more reference illumination sources of the plurality of illumination sources in the scene image, fixed coordinate positions $(x_0, y_0, z_0)$ of the one or more reference illumination sources of the plurality of illumination sources in the scene coordinate system o-xyz, and the included angle $\alpha$;
wherein determining the one or more reference vertex points based on the estimated coordinate $(x_1, y_1, z_1)$ of the positioning device comprises:
obtaining a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and
selecting N vertex points of the polygon grid as the one or more reference vertex points based on the estimated coordinate $(x_1, y_1, z_1)$ of the positioning device;
wherein N≥1.

2. The positioning method of claim 1, wherein the motion data of the positioning device comprises:
a most recent data of a most recent positioning coordinate $(x_{101}, y_{101}, z_{101})'$ of the positioning device in the scene coordinate system o-xyz;

a most recent data of a most recent included angle α' between the x-axis of the scene coordinate system o-xyz and a x'-axis of the positioning device coordinate system o'-x'y'z';

a present data of a present speed of the positioning device in the scene coordinate system o-xyz;

a present data of a present acceleration of the positioning device in the scene coordinate system o-xyz;

a rotation angle of the positioning device during a motion between a present moment and a previous moment, the previous moment being a moment the most recent data of the most recent positioning coordinate $(x_{101}, y_{101}, z_{101})'$ of the positioning device is determined; and a time duration between the present moment and the previous moment.

3. The positioning method of claim 2, wherein determining the estimated coordinate $(x_1, y_1, z_1)$ of the positioning device in the scene coordinate system o-xyz comprises:

performing an inertial navigation positioning using the most recent positioning coordinate $(x_{101}, y_{101}, z_{101})'$ of the positioning device in the scene coordinate system o-xyz at the previous moment as a reference starting point, and based on a combination of:

the present data of the present speed of the positioning device in the scene coordinate system o-xyz;

the present data of the present acceleration of the positioning device in the scene coordinate system o-xyz;

the rotation angle of the positioning device during the motion between the present moment and the previous moment; and the time duration between the present moment and the previous moment.

4. The positioning method of claim 2, wherein determining the included angle α between the x-axis of the scene coordinate system o-xyz and the x'-axis of the positioning device coordinate system o'-x'y'z' based on the motion data of the positioning device comprises:

determining a relative rotation angle δ of a present position coordinate of the positioning device in the scene coordinate system o-xyz at the present moment with respect to a most recent position coordinate of the positioning device in the scene coordinate system o-xyz at the previous moment, based on the rotation angle of the positioning device during the motion between the present moment and the previous moment; and assigning a sum of the most recent included angle α' and the relative rotation angle δ as the included angle α between the x-axis of the scene coordinate system o-xyz and the x'-axis of the positioning device coordinate system o'-x'y'z'.

5. The positioning method of claim 1, further comprising calibrating the inertial measuring device by:

replacing the estimated coordinate of the positioning device in a scene coordinate system o-xyz with an accurate pre-positioning coordinate of the positioning device in the scene coordinate system o-xyz; and replacing a rotation angle of the positioning device during the motion of the positioning device between a starting moment and a present moment with an accurate included angle.

6. The positioning method of claim 1, further comprising:

assigning the projections of the plurality of illumination sources on the xoy plane of the scene coordinate system o-xyz as the plurality of vertex points; and performing the polygonal division on the xoy plane of the scene coordinate system o-xyz based on the plurality of vertex points.

7. The positioning method of claim 1, wherein selecting N vertex points of the polygon grid as the one or more reference vertex points based on the estimated coordinate $(x_1, y_1, z_1)$ of the positioning device comprises:

determining whether a projection of the positioning device on the xoy plane of the scene coordinate system o-xyz is in any polygon of the polygon grid based on the estimated coordinate $(x_1, y_1, z_1)$;

assigning a polygon containing the projection of the positioning device on the xoy plane of the scene coordinate system o-xyz as a selected polygon based on a determination that the projection of the positioning device on the xoy plane of the scene coordinate system o-xyz is in one polygon of the polygon grid, and assigning vertex points of the selected polygon as the N vertex points; and assigning one of the plurality of vertex points within a shortest distance from the projection of the positioning device on the xoy plane of the scene coordinate system o-xyz as the N vertex points based on a determination that the projection of the positioning device on the xoy plane of the scene coordinate system o-xyz is not in any polygon of the polygon grid.

8. The positioning method of claim 1, wherein the polygonal division is a triangulation; and wherein the polygonal division adopts Delaunay triangulation algorithm.

9. The positioning method of claim 1, wherein detecting in the scene image the image objects of the one or more reference illumination sources of the plurality of illumination sources corresponding to the one or more reference vertex points is performed based on a reference coordinate $(x_0, y_0, 0)$ of one of the reference vertex points and the included angle α between the x-axis of the scene coordinate system o-xyz and the x'-axis of a positioning device coordinate system o'-x'y'z'.

10. The positioning method of claim 9, wherein detecting in the scene image the image objects of the one or more reference illumination sources of the plurality of illumination sources corresponding to the one or more reference vertex points comprises:

determining an estimated position of the one or more reference illumination sources of the plurality of illumination sources corresponding to the one or more reference vertex points in the scene image, based on the reference coordinate $(x_0, y_0, 0)$ of one of the reference vertex points and the included angle α between the x-axis of the scene coordinate system o-xyz and the x'-axis of a positioning device coordinate system o'-x'y'z';

setting the estimated position of the one or more reference illumination sources of the plurality of illumination sources in the scene image as a center of a detecting circle having a threshold radius; and selecting image objects of one or more illumination sources of the plurality of illumination sources within the detecting circle having the threshold radius as the image objects of the one or more reference illumination sources of the plurality of illumination sources corresponding to the one or more reference vertex points.

11. The positioning method of claim 1, wherein determining the positioning coordinate $(x_{101}, y_{101}, z_{101})$ of the positioning device in the scene coordinate system o-xyz is based on the positions of the image objects of the one or more reference illumination sources of the plurality of illumination sources in the scene image, the fixed coordinate positions ($x_0$, $y_0$, $z_0$) of the one or more reference illumination sources of the plurality of illumination sources in the scene coordinate system o-xyz, and the included angle α; the method comprises:

determining a pre-positioning coordinate ($x_{101_p}$, $y_{101_p}$, $z_{101_p}$) of the positioning device in the scene coordinate system o-xyz based on each individual one of the positions of the image objects of the one or more reference illumination sources of the plurality of illumination sources in the scene image, each individual one of the fixed coordinate positions ($x_0$, $y_0$, $z_0$) of the one or more reference illumination sources of the plurality of illumination sources in the scene coordinate system o-xyz, and the included angle α;

determining a coordinate ($r_x, r_y, r_z$) of a position vector $\vec{r}^v$ in the positioning device coordinate system o'-x'y'z' for each individual one of the one or more reference illumination sources of the plurality of illumination sources in the scene image;

wherein the pre-positioning coordinate ($x_{101_p}, y_{101_p}, z_{101_p}$) of the positioning device in the scene coordinate system o-xyz is determined using the following equation:

$$(x_{101_p}, y_{101_p}) = (x_0, y_0) - (r_x, r_y) \bullet \begin{bmatrix} \cos\alpha & \sin\alpha \\ -\sin\alpha & \cos\alpha \end{bmatrix};$$

wherein $z_{101_p}$ is a normal distance h between point o' in the positioning device coordinate system o'-x'y'z' and a xoy plane of the scene coordinate system o-xyz.

12. The positioning method of claim 11, wherein determining the coordinate ($r_x$, $r_y$, $r_z$) of the position vector $\vec{r}^v$ in the positioning device coordinate system o'-x'y'z' for each individual one of the one or more reference illumination sources of the plurality of illumination sources in the scene image comprises:

determining an included angle φ between the position vector $\vec{r}^v$ and an z'-axis of the positioning device coordinate system o'-x'y'z' based on the positions of the image objects of the one or more reference illumination sources of the plurality of illumination sources in the scene image;

determining an included angle θ between a projection vector $\vec{r}_H^{uv}$ and the x'-axis of the positioning device coordinate system o'-x'y'z' based on the positions of the image objects of the one or more reference illumination sources of the plurality of illumination sources in the scene image, the projection vector $\vec{r}_H^{uv}$ being an orthographic projection of the position vector $\vec{r}^v$ on a x'o'y' plane of the positioning device coordinate system o'-x'y'z'; and determining the coordinate ($r_x$, $r_y$, $r_z$) of the position vector $\vec{r}^v$ in the positioning device coordinate system o'-x'y'z' based on equation:

$(r_x, r_y, r_z) = (\tan\varphi \cos\theta, \tan\varphi \sin\theta, 1) \cdot |z_0 - h|$.

13. The positioning method of claim 11, wherein:

in condition that there are multiple pre-positioning coordinates ($x_{101_p}, y_{101_p}, z_{101_p}$) of the positioning device in the scene coordinate system o-xyz, an average value ($x_{101_p}, y_{101_p}, z_{101_p}$)$_m$ of the multiple pre-positioning coordinates ($x_{101_p}, y_{101_p}, z_{101_p}$) of the positioning device in the scene coordinate system o-xyz is assigned as the positioning coordinate ($x_{101}, y_{101}, z_{101}$) of the positioning device in the scene coordinate system o-xyz; and in condition that there only one pre-positioning coordinate ($x_{101_p}, y_{101_p}, z_{101_p}$) of the positioning device in the scene coordinate system o-xyz, the only one pre-positioning coordinate ($x_{101_p}, y_{101_p}, z_{101_p}$) of the positioning device in the scene coordinate system o-xyz is assigned as the positioning coordinate ($x_{101}, y_{101}, z_{101}$) of the positioning device in the scene coordinate system o-xyz.

14. The positioning method of claim 13, in condition that there are multiple pre-positioning coordinates ($x_{101_p}, y_{101_p}, z_{101_p}$) of the positioning device in the scene coordinate system o-xyz, the method further comprises:

calculating multiple included angles α respectively between the x-axis of the scene coordinate system o-xyz and the x'-axis of a positioning device coordinate system o'-x'y'z' based on the average value ($x_{101_p}, y_{101_p}, z_{101_p}$)$_m$ of the multiple pre-positioning coordinates ($x_{101_p}, y_{101_p}, z_{101_p}$) of the positioning device in the scene coordinate system o-xyz, the coordinate ($r_x, r_y, r_z$) of the position vector r for each individual one of the one or more reference illumination sources of the plurality of illumination sources in the positioning device coordinate system o'-x'y'z', and the fixed coordinate positions ($x_0, y_0, z_0$) of the one or more reference illumination sources of the plurality of illumination sources in the scene coordinate system o-xyz;

calculating an average value $\alpha_m$ of the multiple included angles α between the x-axis of the scene coordinate system o-xyz and the x'-axis of a positioning device coordinate system o'-x'y'z'; and assigning the average value $\alpha_m$ of the multiple included angles α as an accurate included angle between the x-axis of the scene coordinate system o-xyz and the x'-axis of a positioning device coordinate system o'-x'y'z'.

15. The positioning method of claim 1, wherein:

an origin point o of the scene coordinate system o-xyz is on ground;

a z-axis of the scene coordinate system o-xyz is substantially parallel to an optical axis of a camera in the positioning device;

the scene image is captured by the camera of the positioning device;

the optical axis of the camera of the positioning device is substantially perpendicular to the ground;

an origin point o' of the positioning device coordinate system o'-x'y'z' is on the camera of the positioning device; and a z'-axis of the positioning device coordinate system o'-x'y'z' substantially overlaps with the optical axis of the camera of the positioning device.

16. The positioning method of claim 1, further comprising receiving data of the fixed coordinate positions ($x_0, y_0, z_0$) of the one or more reference illumination sources of the plurality of illumination sources in the scene coordinate system o-xyz.

17. The positioning method of claim 1, further comprising measuring a normal distance h between an origin point o' of the positioning device coordinate system o'-x'y'z' and ground.

18. The positioning method of claim 1, further comprising:

assigning the estimated coordinate ($x_1$, $y_1$, $z_1$) of the positioning device in a scene coordinate system o-xyz as the positioning coordinate ($x_{101}, y_{101}, z_{101}$) of the positioning device in the scene coordinate system o-xyz in condition that no illumination source is detected; and determining the positioning coordinate ($x_{101}$, $y_{101}$, $z_{101}$) of the positioning device in the scene coordinate system o-xyz based on the positions of the image objects of the one or more reference illumination sources of the plurality of illumination sources in the scene image, the fixed coordinate positions ($x_0$, $y_0$, $z_0$) of the plurality of illumination sources in the scene coordinate system o-xyz, and the included angle $\alpha$.

19. A positioning apparatus, comprising:
a camera configured to obtain a scene image comprising image objects of a plurality of illumination sources, the scene image acquired by a positioning device;
an inertial measuring device configured to obtain motion data of the positioning device;
a memory; and
one or more processors;
wherein the memory and the one or more processors are connected with each other; and
the memory stores computer-executable instructions for controlling the one or more processors to:
receiving the scene image comprising image objects of a plurality of illumination sources;
receive the motion data of the positioning device during a motion, the motion data stored in the memory;
determine an estimated coordinate ($x_1$, $y_1$, $z_1$) of the positioning device in a scene coordinate system o-xyz based on the motion data of the positioning device;
determine an included angle $\alpha$ between an x-axis of the scene coordinate system o-xyz and an x'-axis of a positioning device coordinate system o'-x'y'z' based on the motion data of the positioning device;
determine one or more reference vertex points based on the estimated coordinate ($x_1$, $y_1$, $z_1$) of the positioning device;
detect in the scene image objects of one or more reference illumination sources of the plurality of illumination sources corresponding to the reference vertex points; and
determine a positioning coordinate ($x_{101}$, $y_{101}$, $z_{101}$) of the positioning device in the scene coordinate system o-xyz based on one or a combination of:
(1) the estimated coordinate ($x_1$, $y_1$, $z_1$) of the positioning device in the scene coordinate system o-xyz; and
(2) positions of the image objects of the one or more reference illumination sources of the plurality of illumination sources in the scene image, fixed coordinate positions ($x_0$, $y_0$, $z_0$) of the one or more reference illumination sources of the plurality of illumination sources in the scene coordinate system o-xyz, and the included angle $\alpha$;
wherein determining the one or more reference vertex points based on the estimated coordinate ($x_1$, $y_1$, $z_1$) of the positioning device comprises:
obtaining a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and
selecting N vertex points of the polygon grid as the one or more reference vertex points based on the estimated coordinate ($x_1$, $y_1$, $z_1$) of the positioning device;
wherein N≥1.

20. A computer-program product comprising a non-transitory tangible computer-readable medium having computer-readable instructions thereon, the computer-readable instructions being executable by a processor to cause the processor to perform:
receiving, by a processor, a scene image comprising image objects of a plurality of illumination sources, the scene image acquired by a positioning device;
receiving, by the processor, motion data of the positioning device during a motion, the motion data acquired by an inertial measuring device and stored in a memory;
determining, by the processor, an estimated coordinate ($x_1$, $y_1$, $z_1$) of the positioning device in a scene coordinate system o-xyz based on the motion data of the positioning device;
determining, by the processor, an included angle $\alpha$ between an x-axis of the scene coordinate system o-xyz and an x'-axis of a positioning device coordinate system o'-x'y'z' based on the motion data of the positioning device;
determining, by the processor, one or more reference vertex points based on the estimated coordinate ($x_1$, $y_1$, $z_1$) of the positioning device;
detecting, by the processor, in the scene image objects of one or more reference illumination sources of the plurality of illumination sources corresponding to the one or more reference vertex points; and
determining, by the processor, a positioning coordinate ($x_{101}$, $y_{101}$, $z_{101}$) of the positioning device in the scene coordinate system o-xyz based on one or a combination of:
(1) the estimated coordinate ($x_1$, $y_1$, $z_1$) of the positioning device in the scene coordinate system o-xyz; and
(2) positions of the image objects of the one or more reference illumination sources of the plurality of illumination sources in the scene image, fixed coordinate positions ($x_0$, $y_0$, $z_0$) of the one or more reference illumination sources of the plurality of illumination sources in the scene coordinate system o-xyz, and the included angle $\alpha$;
wherein determining the one or more reference vertex points based on the estimated coordinate ($x_1$, $y_1$, $z_1$) of the positioning device comprises:
obtaining a polygon grid derived from a polygonal division on a xoy plane of the scene coordinate system o-xyz based on a plurality of vertex points, the plurality of vertex points being projections of the plurality of illumination sources on the xoy plane of the scene coordinate system o-xyz; and
selecting N vertex points of the polygon grid as the one or more reference vertex points based on the estimated coordinate ($x_1$, $y_1$, $z_1$) of the positioning device;
wherein N≥1.

* * * * *